United States Patent
Sagawa

(10) Patent No.: US 7,756,940 B2
(45) Date of Patent: Jul. 13, 2010

(54) TRANSACTION PROCESSING SYSTEM HAVING SERVICE LEVEL CONTROL CAPABILITIES

(75) Inventor: Nobutoshi Sagawa, Koganei (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 11/208,522

(22) Filed: Aug. 23, 2005

(65) Prior Publication Data

US 2006/0031286 A1    Feb. 9, 2006

Related U.S. Application Data

(63) Continuation of application No. 09/942,215, filed on Aug. 30, 2001, now abandoned.

(30) Foreign Application Priority Data

Feb. 5, 2001    (JP) ............................. 2001-028231

(51) Int. Cl.
G06F 15/16 (2006.01)
G06F 15/167 (2006.01)

(52) U.S. Cl. .................. 709/207; 709/203; 709/219

(58) Field of Classification Search ................ 709/203, 709/207, 219
See application file for complete search history.

(56) References Cited

U.S. PATENT DOCUMENTS

| | | | | |
|---|---|---|---|---|
| 5,594,905 | A | | 1/1997 | Mital et al. .................. 710/260 |
| 5,655,120 | A | * | 8/1997 | Witte et al. .................. 718/105 |
| 5,675,739 | A | * | 10/1997 | Eilert et al. .................. 709/226 |
| 6,055,564 | A | * | 4/2000 | Phaal ........................... 709/207 |
| 6,154,769 | A | * | 11/2000 | Cherkasova et al. ......... 709/207 |
| 6,157,963 | A | * | 12/2000 | Courtright et al. ............. 710/5 |
| 6,205,150 | B1 | * | 3/2001 | Ruszczyk .................... 370/412 |
| 6,226,377 | B1 | * | 5/2001 | Donaghue, Jr. ......... 379/265.13 |
| 6,324,625 | B1 | | 11/2001 | Singer et al. ................. 711/154 |
| 6,378,051 | B1 | | 4/2002 | Henson et al. .............. 711/151 |
| 6,442,550 | B1 | * | 8/2002 | Rajamony ..................... 707/10 |
| 6,614,790 | B1 | * | 9/2003 | Veres et al. ............... 370/395.2 |
| 6,681,230 | B1 | | 1/2004 | Blott et al. ................ 707/104.1 |
| 6,701,324 | B1 | * | 3/2004 | Cochran et al. ........... 707/104.1 |
| 6,724,885 | B1 | | 4/2004 | Deutsch et al. ......... 379/265.02 |
| 6,882,623 | B1 | * | 4/2005 | Goren et al. ................. 370/230 |
| 6,950,885 | B2 | * | 9/2005 | Shah ........................... 710/36 |
| 7,046,665 | B1 | * | 5/2006 | Walrand et al. .............. 370/392 |
| 7,046,685 | B1 | * | 5/2006 | Matsuoka et al. ............ 370/409 |
| 7,075,927 | B2 | * | 7/2006 | Mo et al. ...................... 370/389 |
| 2001/0025310 | A1 | * | 9/2001 | Krishnamurthy et al. .... 709/223 |

FOREIGN PATENT DOCUMENTS

JP    6219957    1/1987

(Continued)

*Primary Examiner*—William C Vaughn, Jr.
*Assistant Examiner*—Kristie D Shingles
(74) *Attorney, Agent, or Firm*—Brundidge & Stanger, P.C.

(57) ABSTRACT

There is provided a transaction processing system for providing plural services according to service level contracts, the system comprising: an SLA database for storing contract conditions defined for each of the services provided; request queues for storing processing requests sent from clients for the services provided while putting the respective services into a particular order; queuing condition detection module for obtaining waiting conditions of the processing requests stored in the request queues; and a scheduler for deciding priorities to the processing requests input from the client to the transaction processing system by referring to the contract conditions and the waiting conditions of the processing requests.

6 Claims, 21 Drawing Sheets

FOREIGN PATENT DOCUMENTS

| | | |
|---|---|---|
| JP | 4358228 | 12/1992 |
| JP | 512226 | 1/1993 |
| JP | 628323 | 2/1994 |
| JP | 652121 | 2/1994 |
| JP | 6243077 | 9/1994 |
| JP | 773143 | 3/1995 |
| JP | 962624 | 3/1997 |
| JP | 1040117 | 2/1998 |

* cited by examiner

FIG. 3

| SERVICE PROVIDER'S NAME | SERVICE NAME | CLASS | UPPER LIMIT | PRIORITY |
|---|---|---|---|---|
| PROVIDER A | SERVICE A1 | U.L. | 10 | 2 |
| PROVIDER A | SERVICE A2 | B.E. | | |
| PROVIDER B | SERVICE B1 | U.L. | 20 | 1 |
| PROVIDER B | SERVICE B2 | B.E. | | |
| PROVIDER B | SERVICE B3 | U.L. | 10 | 3 |

| STARTING BITE (901) | LENGTH (902) | TYPE (903) | |
|---|---|---|---|
| 0 | 32 | CHARACTER STRING | SERVICE PROVIDER'S NAME |
| 32 | 32 | CHARACTER STRING | SERVICE NAME |
| 64 | | | VARIABLE PART |

FIG. 4B

| SERVICE PROVIDER'S NAME (905) | SERVICE NAME (906) | TABLE INDEX (907) |
|---|---|---|
| SERVICE PROVIDER A | SERVICE A1 | 1 |
| SERVICE PROVIDER B | SERVICE A2 | 2 |
| SERVICE PROVIDER B | SERVICE B1 | 3 |

FIG. 4C 1 (908)

| STARTING BITE (909) | LENGTH (910) | TYPE (911) | |
|---|---|---|---|
| 64 | 4 | INTEGER | ACCOUNT NUMBER |
| 68 | 12 | CHARACTER STRING | TIME STAMP |
| 80 | 8 | INTEGER | WITHDRAWAL AMOUNT |

FIG. 4D 2 (912)

| STARTING BITE (913) | LENGTH (914) | TYPE (915) | |
|---|---|---|---|
| 64 | 4 | INTEGER | ACCOUNT NUMBER |
| 68 | 12 | CHARACTER STRING | TIME STAMP |
| 80 | 8 | INTEGER | WITHDRAWAL AMOUNT |

| SERVICE NAME | SERVICE A | SERVICE A | SERVICE A | SERVICE A | SERVICE A |
|---|---|---|---|---|---|
| NODE NAME | NODE A | NODE B | NODE C | NODE D | NODE E |
| NODE TYPE | INPUT NODE | PROCESSING NODE | CONVERSION NODE | OUTPUT NODE | OUTPUT NODE |
| INPUT SOURCE | | NODE A | NODE B | NODE C | NODE B |
| OUTPUT DESTINATION 1 | NODE B | NODE C | NODE D | | |
| OUTPUT DESTINATION 2 | | NODE E | | | |
| MODULE | "IN1" | "AG" | "TR" | "O1" | "O2" |

| MODULE NAME | "IN1" | "AG" | "TR" | "O1" | "O2" |
|---|---|---|---|---|---|
| UPDATE COUNTER | 1 | 1 | 2 | 3 | 1 |

1700　1701　1702　1703　1704　1705

LOCK FIELD | N  ~1710

TRANSACTION PROCESSING SYSTEM HAVING SERVICE LEVEL CONTROL CAPABILITIES

The present application is a continuation of application Ser. No. 09/942,215, filed Aug. 30, 2001, now abandoned the contents of which are incorporated herein by reference.

BACKGROUND OF THE INVENTION

1. Field of the Invention

The present invention relates to a transaction processing system, and in particular to implementation of transaction processing in response to requests from plural customers.

2. Description of the Related Art

The transaction system is a system for efficiently executing a lot of processing requests in such a manner as to assure consistency in a basic line of corporate information system such as financial trading and ordering/order receiving. In general, a client/server system is so constructed that a client (terminal) issues a request and a server executes the main body of transaction processing by accessing a database as required. A processing program executing an actual transaction on the server is called service.

The service providing side in the transaction system is called a service provider. For example, in the retailing bank business, ATMs or tellers are clients, and the basic system including a customer's account database is a server. In this case, the bank is the service provider, which provides services such as withdrawal and deposit transactions.

Transaction processing middleware used on the server side is a transaction monitor. The transaction monitor mainly takes the following two parts.

(1) The transaction monitor receives processing requests sent from clients and queues the processing requests by taking into account request priorities and crowding levels on the server to forward control of the respective requests to appropriate server programs (service) one by one, thus making effective use of server resources.

(2) The transaction monitor detects errors or faults caused during execution of processing. If the processing has completed successfully, it carries out result writing (committing) operation, while if the processing has not completed successfully, it carries out cancel (rollback) or re-run operation. Thus the transaction monitor assures consistency of the transaction processing.

FIG. 18 shows a typical configuration of the transaction monitor.

As shown, a transaction monitor 209 is located on a server 215, while client programs 201, 202 issuing processing requests are located on client terminals 221, 222, respectively.

In general, the server 215 is a UNIX server, a mainframe computer or the like, while the client terminal is a personal computer, an ATM terminal or the like.

The transaction monitor 209 includes request queues 210 and 211, a scheduler 204 and a transaction execution module 207.

The processing request for a service is typically transferred from the client 221 or 222 to the server 215 in the form of a message (electronic text). Therefore, the transaction monitor has a communication function module so that the transaction monitor receives a processing message by controlling its own communication function module.

The message received is stored in the transaction monitor 209 as a processing request. Since two or more requests are usually kept waiting in the transaction monitor 209, the transaction monitor 209 uses the queues 210, 211 as a First-In First-Out data structure to store the requests in the order of input. The requests stored are extracted from the queues 210, 211 in the order of storage as soon as one of resources (CPU, memory etc.) in the transaction execution module 207 becomes available, and processed by corresponding service programs 206.

(Scheduling and Load Balancing)

Scheduling is to extract a request from a queue and move the request to the execution of service program processing for the request. Efficient scheduling is necessary to increase the efficiency of the transaction processing system.

In particular, if there exist plural resources (processor, server etc.) that provide services, processing efficiency depends a lot on how to allocate the requests to the plural resources. Allocating requests to the plural resources to increase the efficiency of transaction processing is called load balancing. Thereinafter, including both the scheduling above-mentioned and load balancing operations, the entire allocating process of the requests to the resources may be referred as "scheduling".

As one approach to scheduling, a method of balancing load by increasing or decreasing the number of processes for providing a service is known. An outline of the method will be described with reference to FIG. 19.

In FIG. 19, requests 301 to 309 are stored in a request queue 300. These requests are supposed to be processed by processes 310 to 313 one by one. The term "process" is a unit of program to be processed on a computer, and the unit is a combination of one virtual address space, a program loaded on the space, data and a CPU register indicative of an execution state of the program.

In the example of FIG. 19, the same transaction processing program (service program) is loaded in all the processes. If free spaces are available in the CPU of the computer, the number of services to be provided concurrently is increased by increasing the number of processes so that the utilization factor of the CPU can be improved.

In other words, increasing or decreasing the number of processes allocated to transactions make it possible to control processing throughput to the transactions (the number of requests to be processed in a unit time).

FIG. 19A shows a case where a very small number of requests are stored in the queue 300. In this case, the transaction monitor allocates a small number of processes (310, 311) to the service concerned according to the number of requests.

FIG. 19B shows a case where a large number of requests arrive and hence the number of requests queued in the queue 300 increases. In this case, the transaction monitor monitors conditions in the queue to increase the number of processes to be allocated to the service (310 to 313).

FIG. 19C shows a case where incoming messages are reduced and the length of the queue becomes short. In this case, the transaction monitor deallocates the idling process 313 from the service and allocate it to another service or task. By associating the length of the queue with the number of processes to be allocated, it becomes possible to improve transaction efficiency within a range of CPU resources.

And, in case that there are plural servers to be controlled by the transaction monitor, a system shown in FIG. 20 is used for balancing load among servers.

Suppose that there are three servers (420 to 422), and that a queue 400 of one of the servers (server 420) including processes 410 and 411 becomes longer than the other queues 401, 402 for reasons of server's processing capacity, crowding level or the like. In this case, a processing program 431 on the client 430 detects this state and controls itself to send messages by priority to shorter queue servers 421, 422 which includes processes 412n, 413 and processes 414, 415, respectively. Thus, the queues can be balanced in length among the plural servers to improve the total throughput.

(Message Broker)

Example applications of the transaction monitor for a further advanced multi-transaction processing system include a message broker.

A normal transaction processing system has a one-to-one correspondence between a message and a service, but a message broker performs processing by passing one message among plural services by recursively invoking. The message broker stores in the transaction monitor a service flow (business flow), which designates what services and in what sequence the services are invoked for the message. The services to be invoked may be located on the same server as the transaction monitor or another independent stand-along server.

FIG. 21 shows a configuration of the message broker.

Client programs 501, 502 from which processing requests are issued are located on client terminals, respectively. A transaction monitor 509 is located on a transaction processing server.

Service programs A520 and B521 for providing business services are loaded on different servers 530, 531 (or the same server) through a message adapter 515. The terminals and the servers are connected with each other through message communications lines. The transaction monitor 509 includes request queues 510, 511 and a scheduler 504 for deciding the sequence of request processing.

Compared to the normal transaction processing system (FIG. 18), the message broker adds an extension to the transaction execution module (207 in FIG. 18) to constitute a service flow execution routine 507.

The service flow execution routine 507 manages the execution of a service flow defined by the service provider, not just initiate and execute a service program according to a message.

Since the message broker allows the execution of a service flow 506 on the transaction monitor, it can combine plural service programs to construct more complicated service structure.

(Node Replacement During Operation)

In the message broker the service flow may often be altered or changed due to an update or addition of business service. It is undesirable to stop the entire system each time the service flow is altered or changed. For this reason, a mechanism for changing only the service flow without stopping the system operation is highly required.

One method is to divide the processes executing the service flow into two groups (active group and standby group). In this case, the active group executes the unchanged flow while re-loading a new service flow to the standby group. Upon completion of loading, message routing is switched from the active group to the standby group in the continuation of the system's operation.

Another method is to provide routing enable and disable modes for each service node. In this case, a node to be replaced is changed to routing disable mode, thereby prohibiting input of any message to the node upon re-loading of a new service flow to the node.

The above-mentioned transaction or message broker processing systems are known from the following publications: Japanese Patent Laid-Open Application No. 09-062624 (JP-A-09-062624) (Processing System for On-line Transaction); Japanese Patent Laid-Open Application No. 06-243077 (JP-A-06-243077) (Distributed Transaction Processing System); Japanese Patent Laid-Open Application No. 08-063432 (JP-A-08-063432) (Transaction Batch Processing System in Consideration of Priority); Japanese Patent Laid-Open Application No. 06-052121 (JP-A-06-052121) (Batch processing-Real Time Processing Sorting Type Transaction Processing System); Japanese Patent Laid-Open Application No. 07-073143 (JP-A-07-073143) (Time Band-Based Priority Control Transaction Processing System); and Japanese Patent Laid-Open Application No. 10-040117 (JP-A-10-040117) (Task Control type On-line Transaction Processing System for Maintaining High Response).

SUMMARY OF THE INVENTION

New business activities such as in a data center, which perform contract outsourcing of systems of plural service providers (or customers) and centralized control of computer resources to improve the total processing efficiency, is growing steadily.

Such a data center is operated under service level agreements (SLA) with service providers to bill the service providers according to the computer resources used (the amount of transaction, associated CPU operating time, data amount, etc.) and service guaranty conditions. To reduce the billing, it is necessary to execute more transactions with fewer computer resources (investment).

In contrast, the above-mentioned conventional transaction processing systems using a transaction monitor or message broker are constructed on assumption that a single service provider provides services to its clients alone. Therefore, these conventional systems do not allow for common use of one transaction processing system among plural service providers, and hence coordination of transaction resources (computer resources) and amounts of throughput among the plural service providers.

In other words, upon receiving transaction processing requests from plural clients, the conventional systems cannot make effective use of computer resources, which makes it difficult to secure a sufficient amount of throughput for each client.

Further, the above-mentioned conventional message broker or transaction monitor needs to be provided with an auxiliary process group or routing closing means for updating the service flow due to an update or addition of business services. In other words, the conventional message broker or transaction monitor does not allow for effective use of computer resources among plural clients, which makes flexible operation difficult.

It is therefore an object of the present invention to realize a transaction processing system suitable for providing business services to plural service providers by enabling transaction priority control and allocation control of computer resources in consideration of the above-mentioned SLA.

A representative mode to be disclosed in this specification is a transaction processing system comprising: means for holding or storing priority conditions defined according to services the transaction processing system provides; queuing means for storing processing requests sent from clients for the services while putting the respective services into a particular order; means for obtaining waiting conditions of the stored process requests from the queuing means; and means of execution prioritization for deciding execution priorities to the processing requests input from the clients to the transaction processing system by referring to the priority conditions and the waiting conditions of the processing requests.

It is preferable that the queuing means is provided with plural queues each of which can store processing requests from each customer or user to which corresponding service is provided. It is also preferable that the means for storing priority conditions contains priority conditions defined according to the type of processing (service to be executed) and the customer or user.

Specifically, the transaction processing system further comprises means for detecting throughput to a transaction to control the allocation of computer resources to each service, and means for allocating transaction processing processes to the service, wherein the means for allocating processes decides the allocation of processes to the service by referring to the process request waiting conditions obtained and the transaction throughput detected.

More specifically, the transaction processing system further comprises means for storing an identifier or identifiers of one or more execution modules constituting each service, and means for managing an update of each execution module on the basis of the identifier, whereby when the update managing means executes the update of the execution module, the updated execution module is placed (loaded) to storage means prior to starting the transaction corresponding to the service.

As discussed above and according to the present invention, the transaction processing system or message broker carries out priority control to each service in consideration of priority conditions defined according to the services the transaction processing system provides, and processing request waiting conditions obtained from the queuing means for storing processing requests sent from clients for the services while putting the respective services into a particular order.

The above configuration makes possible transaction scheduling which meets the contract conditions for each service the transaction processing system provides for each customer, and hence real time processing of more on-line transactions with less computer resources with maintaining the throughput guaranteed under contract with the customer. Thus the reliability and performance of the data center that integrally processes business transactions for plural customers can be improved.

According to the present invention, the transaction processing system further comprises means for detecting throughput to a transaction corresponding to each service, and means for allocating a transaction processing processes to the service, wherein the means for allocating the processes decides the allocation of processes to the service by referring to the process request waiting conditions obtained and the transaction throughput detected.

The above-mentioned configuration makes possible the allocation of such processes as to meet the contract conditions for each service the transaction processing system provides for each customer, and hence real time processing with maintaining the throughput guaranteed under contract with the customer. Thus the reliability and performance of the data center that integrally processes business transactions for plural customers can be improved.

According to the present invention, the transaction processing system further comprises means for storing an identifier or identifiers of one or more execution modules constituting each service, and means for managing an update of each execution module on the basis of the identifier, wherein when the execution module or modules have been updated by the update managing means, the updated execution module or modules are placed in the storage means prior to starting the transaction corresponding to the service.

In the above-mentioned configuration, when the execution module or modules have been updated by the update managing means, the updated execution module or modules are placed in the storage means prior to starting the transaction corresponding to the service, which makes possible an update or addition of business services with maintaining the system operation. Thus the flexibility and availability of the transaction processing system can be improved. Further, since any auxiliary process group or routing closing means does not need to be provided for updating the execution modules, effective use of computer resources can be realized.

BRIEF DESCRIPTION OF THE DRAWINGS

FIG. 3 is a table showing an SLA database.

FIGS. 4A to 4D are tables showing a message dictionary, in which FIG. 4A shows a fixed part definition module and FIGS. 4B to 4D show variable part definition modules.

FIGS. 5A and 5B are descriptive diagrams of a service flow, in which

FIG. 5A shows a relationship between node and service program, and FIG. 5B shows a relationship among node name, node type, input source, output destination and module.

FIGS. 19A to 19C are diagrams showing conventional process number control, in which FIG. 19A is a case where there exists one request, FIG. 19B is a case where many requests are waiting, and FIG. 19C is a case where the requests are reduced.

DESCRIPTION OF THE EMBODIMENTS

Hereinbelow, one preferred embodiment of the present invention will be described with reference to the accompanying drawings.

1. Hardware Structure

Figure 2:
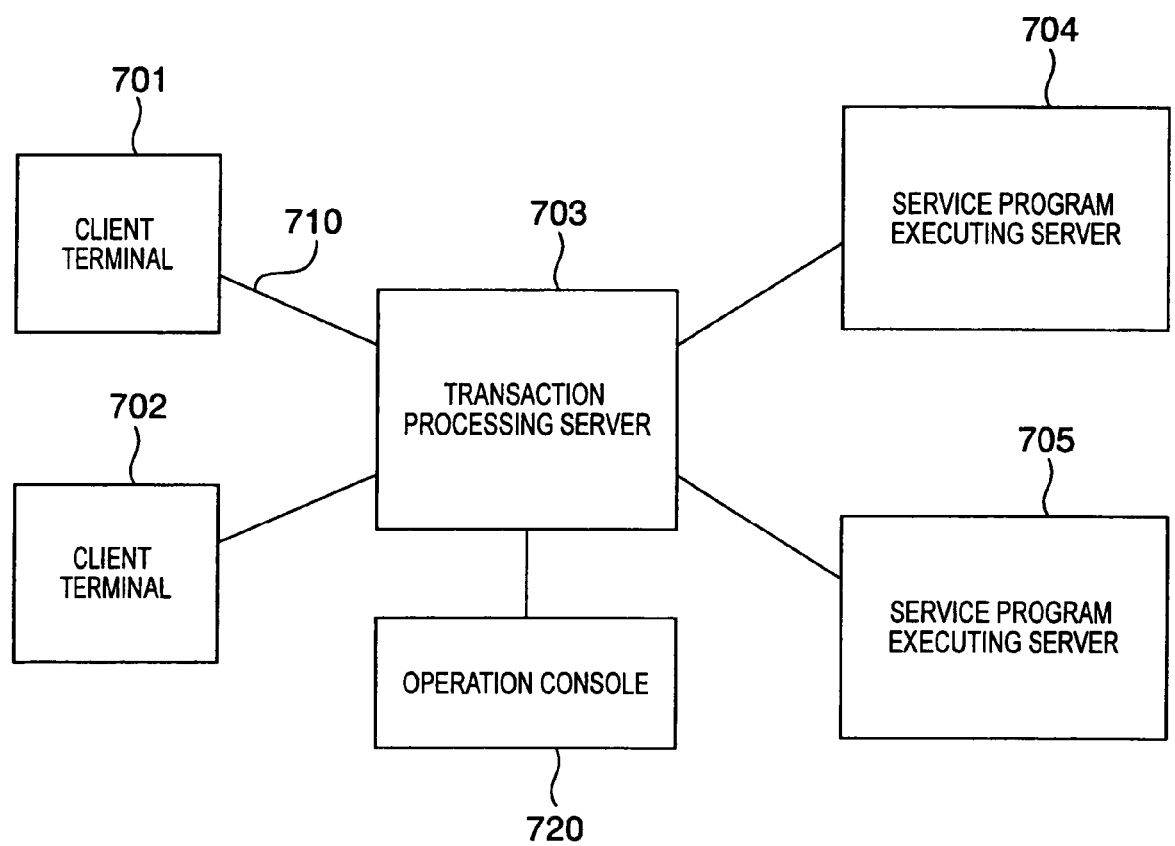
FIG. 2 is a block diagram showing a hardware structure of the embodiment according to the present invention.

FIG. 2 shows a hardware structure of a computer system according to one preferred embodiment of the present invention. The system is constructed of one or more client terminals 701, 702, one or more transaction servers 703, and one or more service program executing servers 704, 705. An operation console 720 is connected to the server 703. It should be noted that the same computer may be used commonly for the transaction processing server and the service program executing server.

The client terminals 701, 702 may be ATM (Automatic Teller Machine) terminals or personal computers on which operating systems such as Microsoft Windows or Linux can be run.

The transaction processing server 703 and the service program executing servers 704, 705 are, for example, UNIX servers like Hitachi 3500 series, Windows NT servers (trademark) like Hitachi Flora (trademark) series, or mainframe general-purpose computers like Hitachi MP series. Communication lines 710 connecting the clients and each server are, for example, general-purpose networks such as the Ethernet. It should be noted that the transaction processing server 703 and the service program executing servers 704, 705 are equipped with storage means such as memories or hard disks, not shown.

2. General Structure of the Embodiment

Figure 1:
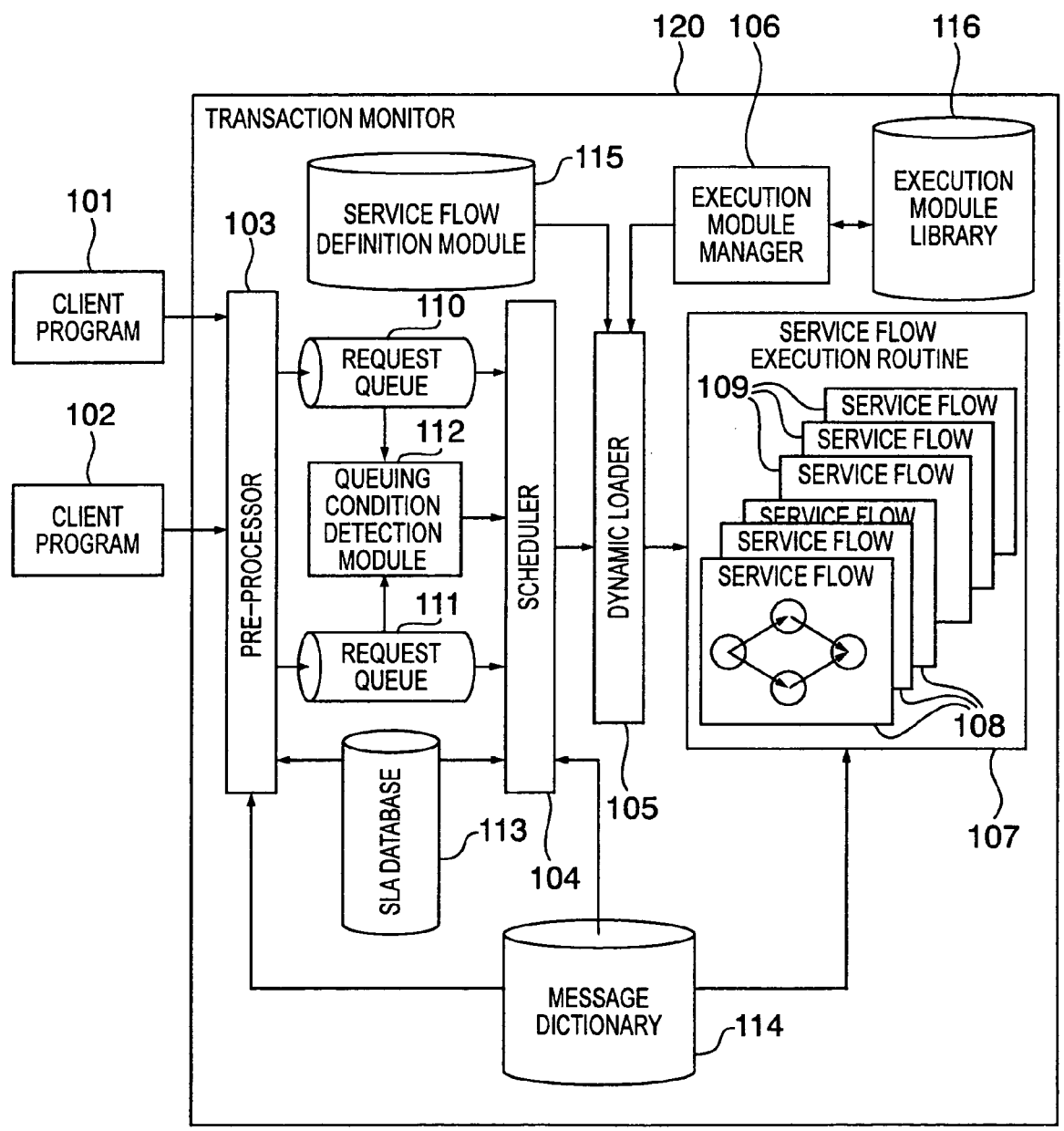
FIG. 1 is a block diagram showing a general structure of one preferred embodiment according to the present invention.

Referring to FIG. 1, description will be made first about a general structure of the embodiment before detailed description of the embodiment.

Client programs 101, 102 are run on the client terminals 701, 702, respectively. The client programs provide interfaces with terminal users in the system. It should be noted that the term "client" denotes the customer-specific client terminal 701 or 702 to be connected to the transaction processing server 703.

The above-mentioned client programs correspond to ATM control programs or client programs for personal computers. The client programs may be Web browsers. Each client program builds up a message in response to input from an end user to send the message to a transaction monitor 120.

The transaction monitor 120 is a key feature of the embodiment. Unlike the conventional transaction monitor 120, the transaction monitor 120 of the embodiment can receive messages (processing requests) to plural service providers (hereinafter, also referred to as customers). It is assumed in FIG. 1 that the number of service providers is two.

An SLA database (priority condition database) 113 stores contract conditions (SLA) related to service levels (priority conditions, allowable waiting time) under contract with each service provider. For example, based on such contract contents that "transactions for service provider A should be processed in 10 seconds or less," an allowable waiting time of 10 msec. and priority U.L may be stored in the database.

A format of messages from each service provider is defined in a message dictionary 114. For example, such a definition that "$10^{th}$ to $20^{th}$ bytes in a message from service provider A describe customer account number" may be stored.

Definitions of a service flow for each service provider are stored in a service flow definition module 115. A group of execution modules corresponding to respective service nodes of the service flow are stored in an executing module library 116.

A preprocessor 103 interprets a message from the client server 101 or 102 to judge which service provider the message belongs to.

Each of request queues 110, 110 is provided for each service provider (each customer) that accesses the transaction monitor 120; it stores requests sent to the service provider. Since it is assumed in FIG. 1 that the number of service providers is two, there exist two request queues 110, 111.

A queuing condition detection module 112 monitors the request queues 110, 111 to obtain their conditions (the number of waiting requests and throughput).

A scheduler 104 decides scheduling priority in consideration of queuing conditions obtained from the queuing condition detection module 112 and the SLA contract conditions stored in the SLA database 113. The scheduler 104 also manages the number of processes 108, 109 allocated for each service provider to decide a proper number of processes which meets the SLA contract.

The messages taken up by the scheduler 104 are sent to a dynamic loader 105.

The dynamic loader 105 decides a service flow corresponding to the current message by referring to the service flow definition module 115.

An execution module manager 106 monitors the executing module library 116 to detect an update if any. The dynamic loader 105 refers to the detection results to judge whether service nodes needed for execution of a service corresponding to the current message have been already loaded in the current process. If not loaded (or old modules remain loaded), a new group of modules are loaded. Then a service flow execution routine 107 executes the service flow scheduled.

Hereinbelow, description will be made in detail about each element constituting the system according to the embodiment of the present invention.

3. SLA Database

Referring to FIG. 3, an exemplary configuration of the SLA database 113 will be described.

The SLA database 113 is stored on a disk in the form of a table. A data center operating the transaction monitor 120 accumulates contract contents under contract with customers (service providers) in the SLA database 113.

The first row in the table contains column heads of Service Provider's Name 801, Service Name (Processing Type) 802, Class 803, Upper Limit 804 and Priority 805.

The column below Service Provider's Name 801 lists names of service providers as processing contract targets of the transaction monitor. This column may contain any character string as long as it is a unique name.

The column below Service Name 802 lists names of services provided by the corresponding service providers through the transaction monitor. The column below Class 803 represents types of contracts with the respective service providers, where "B.E." stands for "Best Effort" to indicate such a contract item that the transaction should be scheduled as long as resources are available. In this case, if the resources are crowded with other transactions, the transaction might be kept waiting a long time. On the other hand, "U.L." stands for "Upper Limit" to indicate a contract item which decides on the upper limit of transaction waiting time.

The column below Upper Limit 804 represents upper limit times under the "U.L." contract. If the corresponding service provider has a contract for "B.E.", the column does not make sense.

The column below Priority 805 represents priorities to services under the "U.L." contract. If the resources are so crowded that the "U.L." contract cannot be satisfied, scheduling of services is carried out in order of precedence. It should be noted that Priority 805 may be decided according to the contact with each service provider or the data center side may independently assign priorities to service providers as customers or to services.

FIG. 3 shows a basic structure of the SLA database. In addition to the basic structure, the data center can independently set other items, for example, such as priority according to processing load on each service.

Thus, priority and upper limit (allowable waiting time) are defined for each service (each customer, where processing=type of service flow) in the SLA database (means for storing priority conditions). These definitions are set and stored by an operator through input means, not shown. The preprocessor 103 and the scheduler 104 refers to the priority conditions stored in the SLA database 113. The scheduler 104 (means of execution prioritization) searches the SLA database 113 for a service provider's name and service name on the basis of service identification information as search criteria in a manner to be described later to read in the priority conditions.

4. Message Dictionary

Referring to FIGS. 4A to 4D and FIG. 6, an exemplary configuration of the message dictionary 114 will be described. The message dictionary 114 stores definitions of a message format for each service provider and each service.

Figure 6:
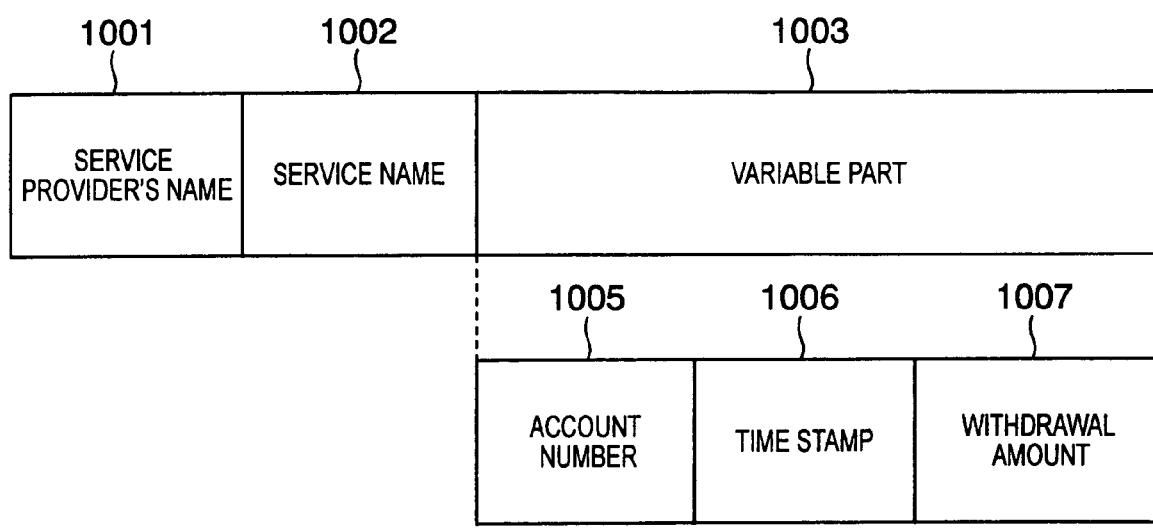
FIG. 6 is a diagram showing data structure of a message.

Each of messages the transaction monitor 120 receives is composed of a fixed part (1001, 1002 in FIG. 6) and a variable part including an account number 1005, a time stamp 1006 and a withdrawal amount 1007 (1003 in FIG. 6). The fixed part contains message fields unique to the transaction monitor 120 while the variable part contains a message field varied by each service provider and each service.

Corresponding to the message structure of FIG. 6, the message dictionary 114 also contains a fixed part definition module (FIG. 4A) and variable part definition modules (FIGS. 4B, 4C and 4D).

In the example of FIG. 4A, the fixed part definition module has columns of Starting Byte (901), Length (902) and Type (903), indicating that the service provider's name is stored in a 32-byte field from zero byte, and the service name is stored in a 32-byte field from the $32^{nd}$ byte. The $64^{th}$ byte and the following bytes belong to the variable part.

The variable part definitions are made by combining a variable-part index definition module (FIG. 4B) with variable-part field definition modules (FIGS. 4C and 4D).

The variable-part index definition module is formed into a table for use in searching indexes of the variable-part field definition modules on the basis of the service provider's name 905 and the service name 906 (service identification information) entered in the fields 1001, 1002 of the message fixed part. For example, in FIG. 4B, the index for "service provider A" and "service A1" is "1" From table index 907.

The variable-part field definition module (FIG. 4C) having the same table index 908 (="1") represents definitions related to "service A1." Similarly, the index 912 for "service A2" of "service provider A" is "2." The variable-part field definition module (FIG. 4D) having the same table index represents definitions related to "service A2."

Each table index sets fields of Starting Byte (909, 913), Length (910, 914) and Data Type (911, 915). FIG. 4C shows that the account number is stored in a four-byte field from the $64^{th}$ byte, the time stamp is stored in a 12-byte field from the $68^{th}$ byte, and the withdrawal amount is stored in an 8-byte field from the $80^{th}$ byte. FIG. 4D also shows the same except that the 8-byte field from the $80^{th}$ byte corresponds to the current balance.

Upon inputting a message to the transaction monitor 120, the definition modules allow the transaction monitor 120 to judge, from the fixed part 1001, 1002 of the message, which service provider and which service the message belong to. Further, in the variable part 1003 of the message, parameters of the service can be set.

5. Service Flow Definition Module and Service Flow Execution Routine

As shown in FIG. 5, the service flow execution routine 107 is formed by connecting individual processes on the basis of the message entered. Combining plural processes (processing nodes), each of which has its own purpose, makes it possible to realize a complicated function.

Figures 5A, 5B:
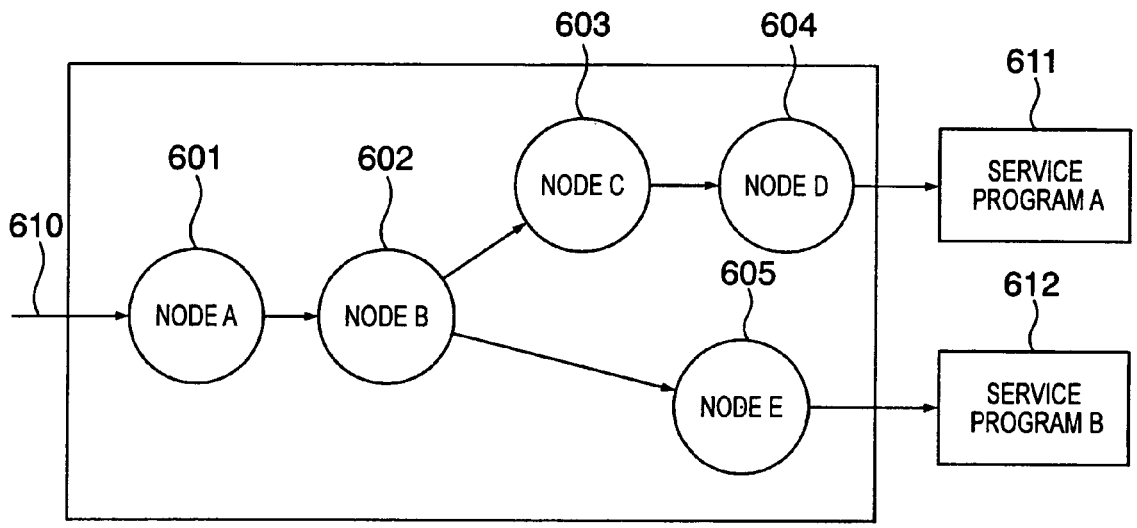

FIG. 5A shows a service flow consisting of five processing nodes 601 to 605, in which arrows indicate a flow of the message between nodes.

The node 601 receives the message from a terminal via the transaction monitor, and forwards the message to the processing node 602. The processing node 602 refers to the message to perform processing defined by the user while modifying the message if required, and forwards the message to the downstream nodes 603, 604 and 605 accordingly.

The node 603 is a message conversion node that performs code conversion of the message according to the coding format of a service program on the output destination side (for example, it performs conversion from EBCDIC code to ASCII code). The nodes 604 and 605 are output nodes from which the message is send out to external service programs 611, 612 via the transaction monitor.

FIG. 5B shows information on the service flow definition module 115.

Columns 620 to 624 represent definition conditions for the nodes 601 to 605, respectively. The service name specifies a service name to which each node belongs. The node name specifies any node name in such a manner that the node name is determinately defined in the flow. The node type selects and specifies an appropriate one of the node types provided in the message broker system from among the node types, such as input node, processing node, conversion node and output node. The input source and the output destination specify a node name as input source and output destination to and from the node specified in the corresponding "Node Name" column. For example, the node B 602 receives the message from the node A 601, and output the message to the node C 603 and the node E 605. Further, the processing node and the conversion node have individual processing contents specified.

The specification of the processing contents is made possible by storing corresponding processing modules in the bottommost "Module" columns of the definition conditions 620 to 624. Since the other nodes such as the input/output nodes perform routine processing and use predetermined regular modules, their processing names do not need specifying.

The service flow definition module 115 and the service flow execution routine 107 allow the execution of the service flow on the transaction monitor, which in turn makes it possible to construct a message broker capable of providing more complicated services by combining plural service programs.

6. Executing Module Library

The executing module library 116 stores execution module groups needed for executing each service node in the service flow. Each execution module can be stored, for example, in the UNIX file format. The file name is made correspondent with the module name appearing in the service flow definition module, which makes it possible to retrieve a corresponding execution module from the service flow.

The execution module is created in such a format that it can be dynamically loaded during execution, for example, in the UNIX DLL (Dynamic Loading Library) format.

7. Request Queue

The request queues 110, 111 are data structures for storing messages input to the transaction monitor 120 in the order of input.

Figure 7:
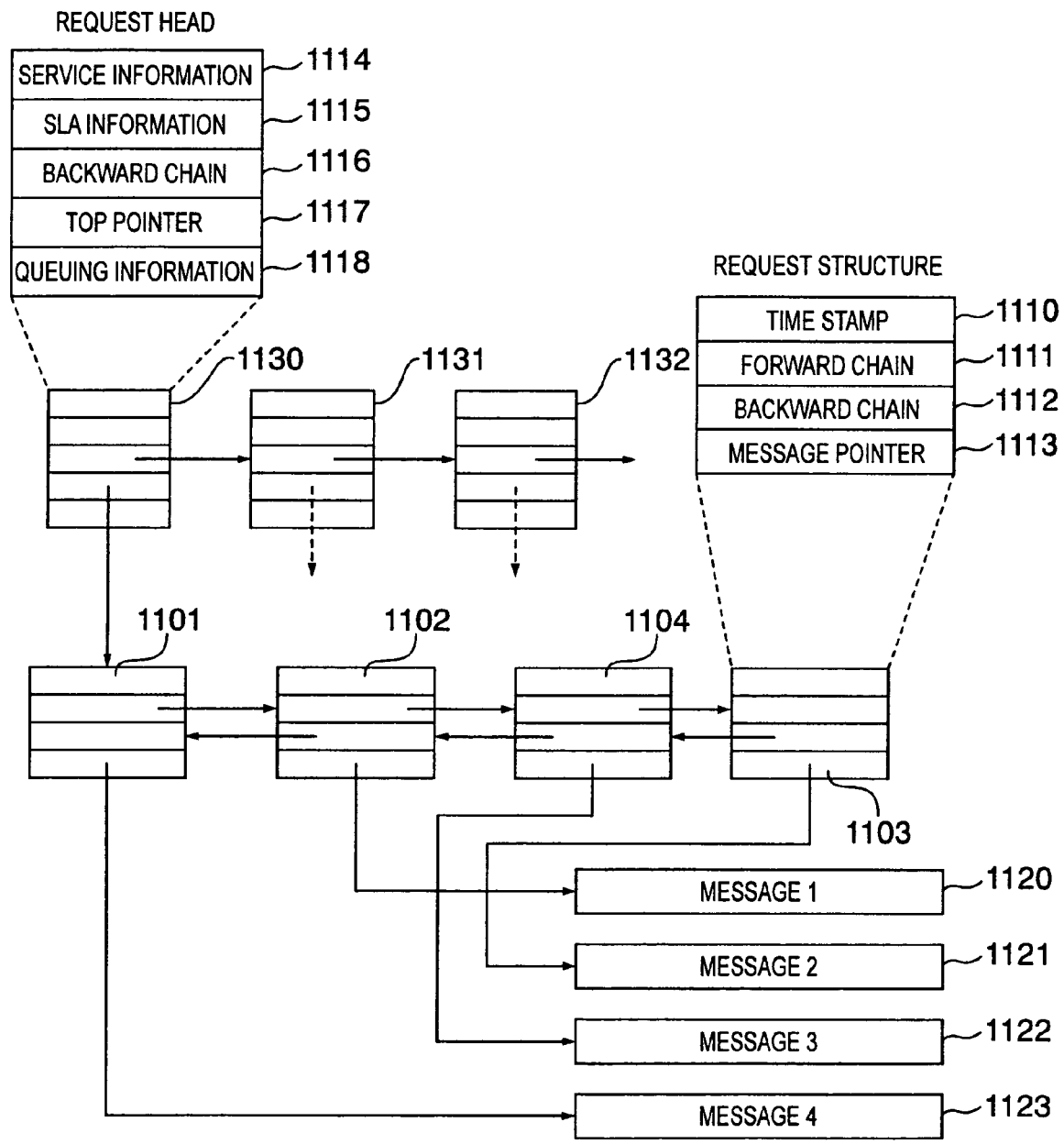
FIG. 7 is a diagram for explaining a configuration of a request queue.

The request queues 110, 111 is created exclusively for each service provided by each service provider registered in the transaction monitor 120. FIG. 7 shows the structure of each request queue.

In FIG. 7, the request queue is constituted of a request header 1114 to 1116 provided one for each queue, and plural request structures 1101 to 1104 connected from the request header in a list structure.

The request header contains fields of service information 1114, SLA information 1115, backward chain 1116, queuing top pointer or start address 1117 and queuing information 1118.

The service information field 1114 is for storing a service provider and service name allocated to the queue. The SLA information field 1115 is for storing an SLA definition module stored in the SLA database 113. The SLA definition module is retrieved from the SLA database 113 on the basis of the service provider and service name and stored in the request header.

The backward chain field 1116 is for storing pointers to connect the request header with the other request headers in a list structure in case of the presence of plural queues. FIG. 7 shows such condition that plural request headers 1130 to 1132 are connected using backward pointers.

The queuing top pointer or start address field 117 is for storing a pointer or start address to the top request structure of each queue (first created request structure in each queue). The queuing information field 1118 is for storing request conditions queued in each queue. Directions for use of the queuing information 118 will be described later.

Each request structure contains four fields 1110 to 1113. The time stamp field 1110 indicates the time of creation of each request. The forward and backward chain fields 1113 and 1114 store pointers for linking request structures with one another to form each queue. The message pointer field 1115 stores a pointer or address to an area in which the message main body is stored.

Chains 1101 to 1104 show such condition that the request structures form a queue in forward and backward chains. Message storage areas 1120 to 1123 correspond to respective requests, and pointed by each message pointer stored in the corresponding request structure.

8. Preprocessor

The preprocessor 103 compares a message input to the transaction monitor with the contents of the message dictionary 114 to analyze which service provider and which service the message belong to. As a result of the analysis, the message is stored in an appropriate request queue 110 or 111.

Figure 8:
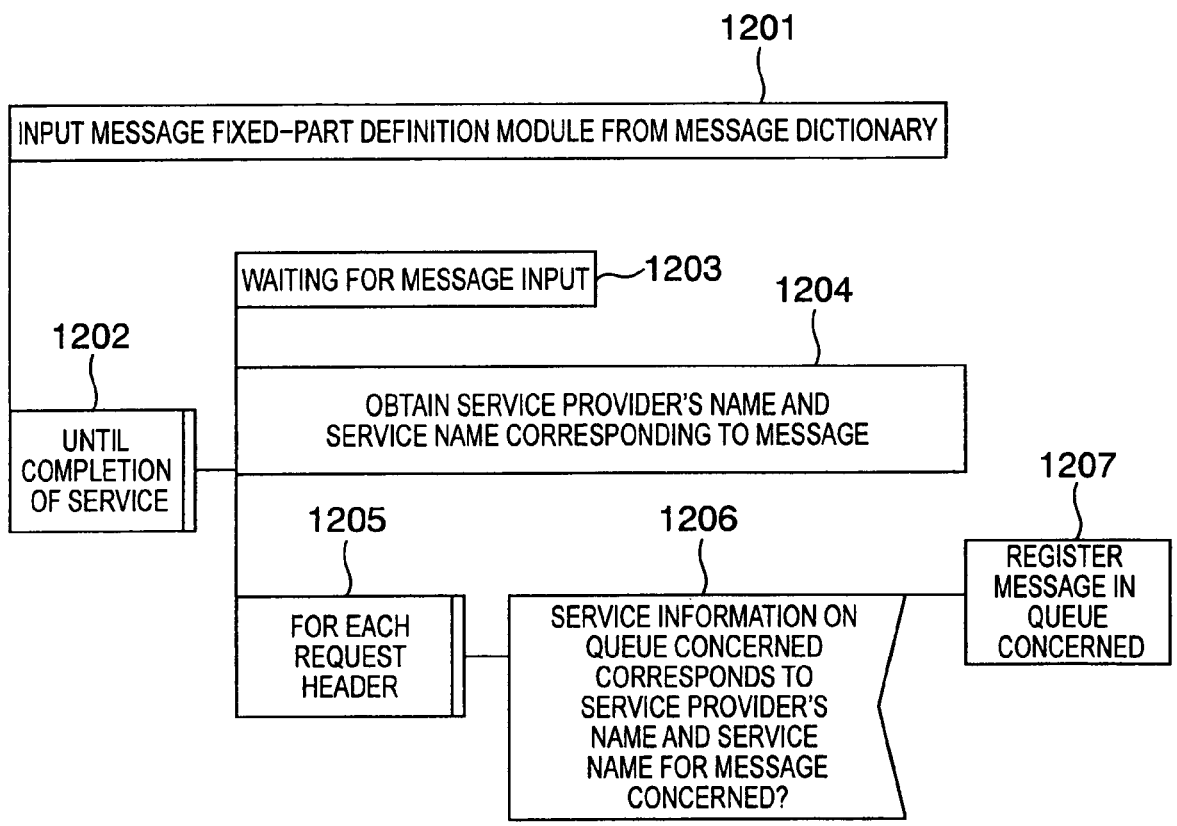
FIG. 8 is a PAD diagram showing operations of the request queue.

FIG. 8 shows an example of an operation flow of the preprocessor.

Upon activation, the preprocessor 103 reads information on the message fixed part (1001, 1002 in FIG. 6) from the message dictionary 114 (1201).

Then, the preprocessor 103 enters a loop 1202 to receive messages from clients until the transaction monitor 120 finishes providing services, and becomes a message input waiting state (1203). After completion of providing all the services, the preprocessor 103 may exit from the loop 1202 or perform interrupt processing to break the loop.

The message input waiting state can be realized, for example, by the UNIX accept system call. Upon receipt of a message, the preprocessor 103 uses the message fixed-part information already read in the step 1201 to extract service provider's name and service name corresponding to the message (1204).

Next, the preprocessor 103 searches the request headers one by one (1205) to retrieve a queue corresponding to the service provider's name and service name obtained (1206) so as to resister the message (electronic text) input to the queue (1207). The registration of the message can be carried out such that a new request structure (1110-1113 in FIG. 7) containing the message, the service provider's name and the service name is created, and put at the tail end of the queue structure (1101-1104 in FIG. 7) with pointer operations.

9. Queuing Condition Detection Module

The queuing condition detection module 112 monitors conditions of the request queues 110, 111 not only to select requests to be scheduled by the scheduler 104, but also to extract information necessary to distribute appropriate resources to the respective services.

The queuing condition detection module 112 is activated at fixed intervals by means of the transaction monitor 120 or the operating system on the server so as to perform predetermined processing. Here, a sigalarm system call of the UNIX operating system can be used to activate the queuing condition detection module 112 at fixed intervals.

Figure 9:
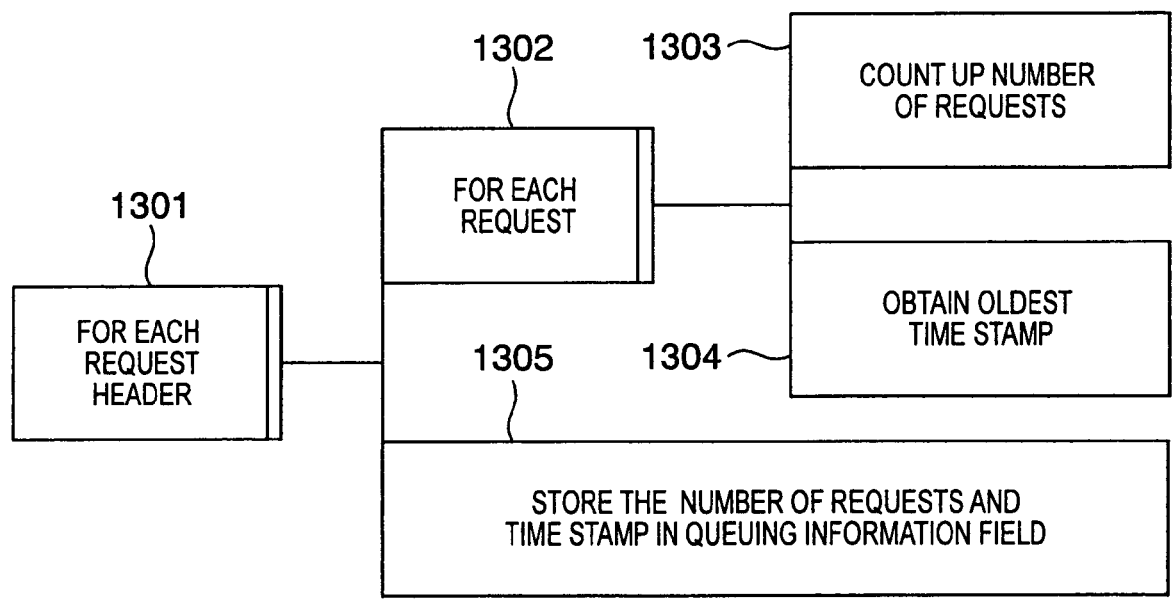
FIG. 9 is a PAD diagram showing operations of a queuing condition detection module.

FIG. 9 shows an example of a processing flow executed each time the queuing condition detection module 112 is activated.

For each request header (1301), a request structure to be pointed from the request header are scanned (1302), and the number of requests in the queue is counted up (1303). Simultaneously, the oldest time stamp from among those of the request structures in the queue is selected (1304).

The number of request and the oldest time stamp are stored in the queuing information field (1118 in FIG. 7) of the request header (1305).

10. Scheduler

The scheduler 104 executes the scheduling of the requests on the basis of the information extracted by the queuing condition detection module 112.

The scheduling is so made that the requests with U.L. (upper limit) contract in the SLA class are given higher priority than those in the B.E. (best effort contract) class, and the requests in the B.E. class are scheduled only when there is room in the computer resources. In either class, the requests are scheduled sequentially from that with the oldest time stamp.

Figure 10:
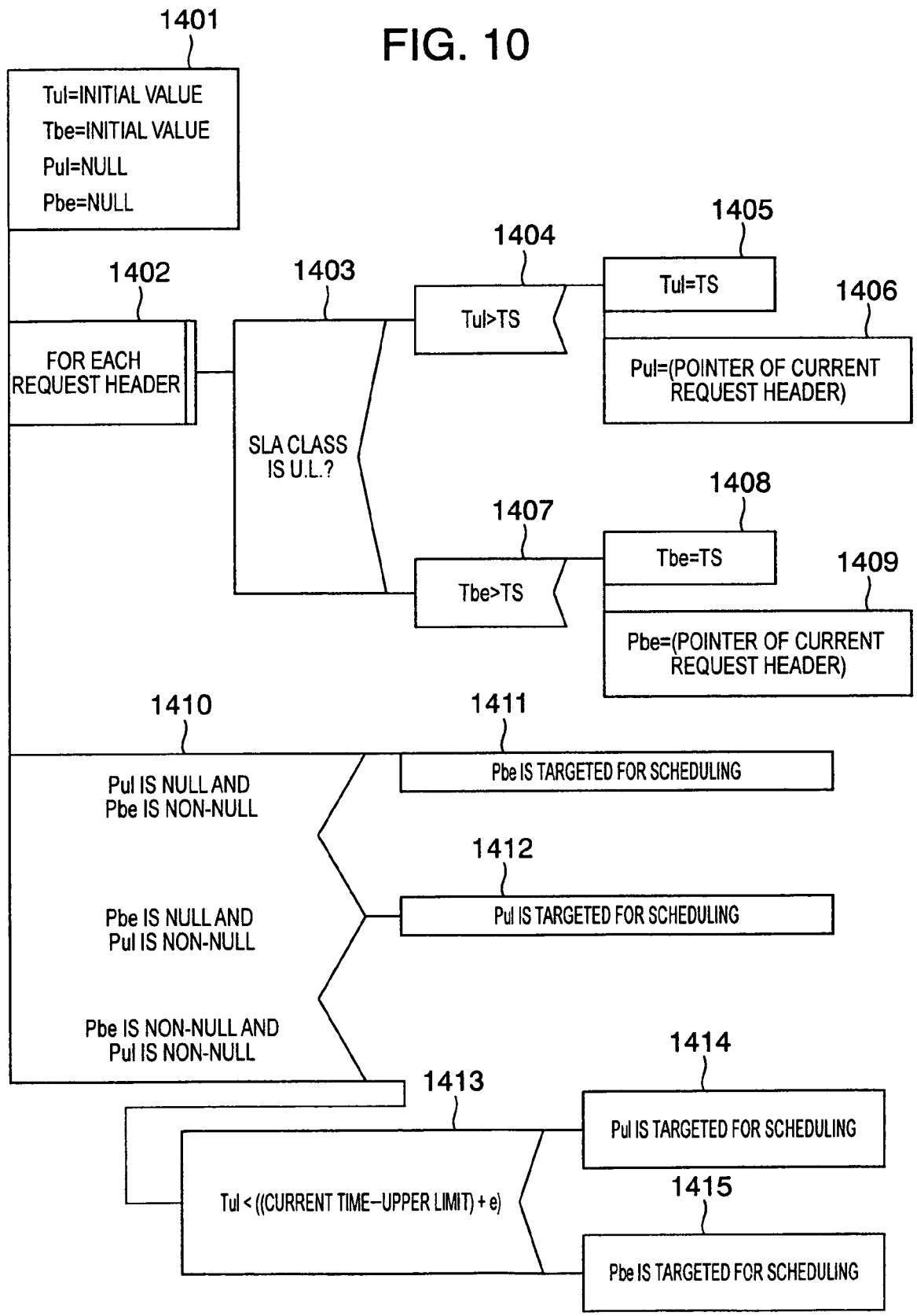
FIG. 10 is a PAD diagram showing operations of a scheduler.

FIG. 10 shows a specific example of a processing flow for selecting requests to be scheduled.

First of all, the scheduler 104 initializes all temporary variables (1401). In step 1401, "Tul" represents a temporary variable for storing the time stamp of each request belonging to the U.L. class service providers, "Tbe" represents a temporary variable for storing the time stamp of each request in the B.E. class, and "Pul" and "Pbe" are temporary variables for storing pointers to the requests in the U.L. and B.E. classes, respectively.

Next, for each header (1402) stored in the request header lists (1130 to 1132 in FIG. 7), the scheduler 104 refers to the SLA information (1115 in FIG. 7) in the header to judge whether the header is in the U.L. or B.E. class (1403).

If the header is in the U.L. class, the scheduler 104 compares the minimum time stamp previously stored as the temporary variable "Tul" with the oldest time stamp in the queue obtained from the queuing information (1118 in FIG. 7) stored in the request header (1404). If the time stamp concerned is older (smaller), the scheduler 104 replaces the temporary variable "Tul" (1405) and stores the pointer to the request header concerned as the temporary variable "Pul" (1406).

On the other hand, if it is judged in the above-mentioned judgment step 1403 that the header concerned belongs to the B.E. class, the scheduler 104 uses the temporary variables "Tbe" and "Pbe" to perform the same operations (1407 to 1409). As a result of the above-mentioned processing flow, the oldest time stamp and its associated request header can be obtained in both the U.L. and B.E. classes.

Next, the scheduler 104 determine which class, the U.L. or B.E. class, should be given preference on scheduling.

First, if either "Pul" or "Pbe" is Null, the scheduler 104 schedules the request not having Null (1410 to 1412).

If both are not Null, the scheduler 104 evaluates both requests form the following equation 1):

$$Tul < ((\text{current time} - \text{upper limit}) + e) \quad 1)$$

In the equation 1), the current time is time during the execution of the processing. The upper limit is the upper-limit time (804 in FIG. 3) of the service concerned under SLA contract defined in the SLA database 113, and is obtained by referring to the SLA information in the request header (1115 in FIG. 7). Further, the symbol "e" represents an offset value decided by an operator of the transaction monitor 120.

The above-mentioned equation 1) is to check whether the request with the oldest time stamp in the U.L. class exists in a time slot (e) of the upper limit delay of the processing defined under SLA contract (1413). If the request exists, the scheduler 104 gives a higher priority to the U.L. class to schedule the request in the U.L. class (1414). On the other hand, if no request exists in the time slot (e), since there is room to process the U.L. class, the request with the oldest time stamp in the B.E. class is scheduled (1415).

11. Dynamic Loader

The dynamic loader 105 receives the request scheduling results from the scheduler 104 to activate processes and load execution modules.

The dynamic loader 105 contains therein process management information for managing conditions of processes to be activated in the service flow execution routine 107.

Figure 11:
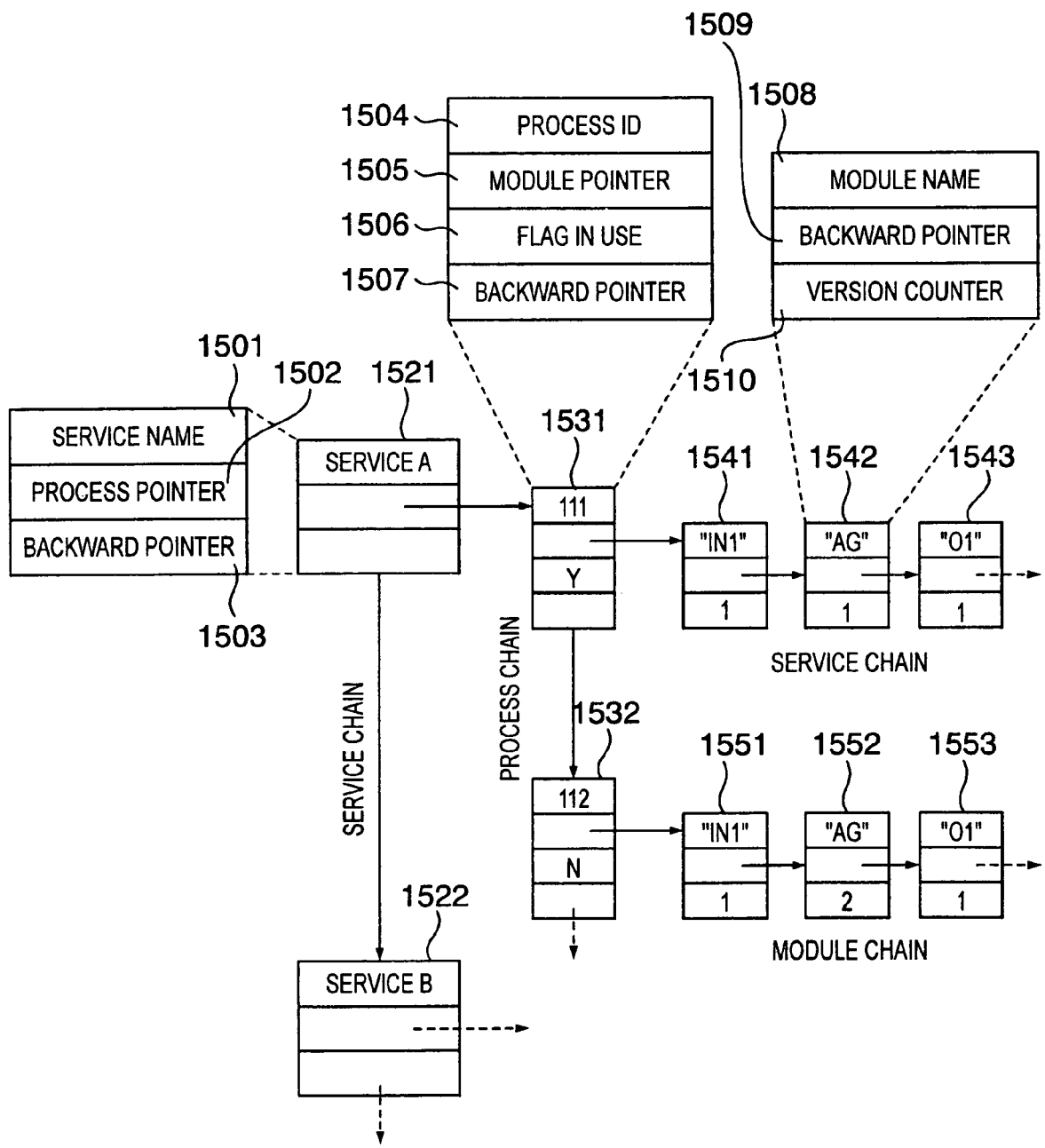
FIG. 11 is a diagram showing a configuration of process management information.

Referring to FIG. 11, an exemplary structure of the process management information will be described.

The process management information is used to manage which process corresponds to each service and which execution module is loaded for the process.

A service structure has fields 1501 to 1503 one of which stores its service name. Such configured service structures 1521, 1522 are linked as shown to create a service-specific list structure (service chain).

Process structures 1531, 1532 are pointed by respective process pointers 1502 from the service structures 1521, 1522, respectively.

The process structures 1531, 1532 each have four fields of process ID 1504, pointer to execution module 1505, flag 1506 indicative of whether the process is in use, and backward pointer 1507.

The process structures 1531, 1532 are linked as shown to form the list structure (process chain). Further, execution module structures 1541-1543 and 1551-1553 are pointed from the process structures 1531 and 1532, respectively.

The execution module structures each store module name 1508, backward pointer 1509 and counter information 1510 indicative of the version of the execution module concerned. The execution module structures 1541 to 1543 (or 1551 to 1553) are linked as shown to form a list structure (module chain).

Figure 12:
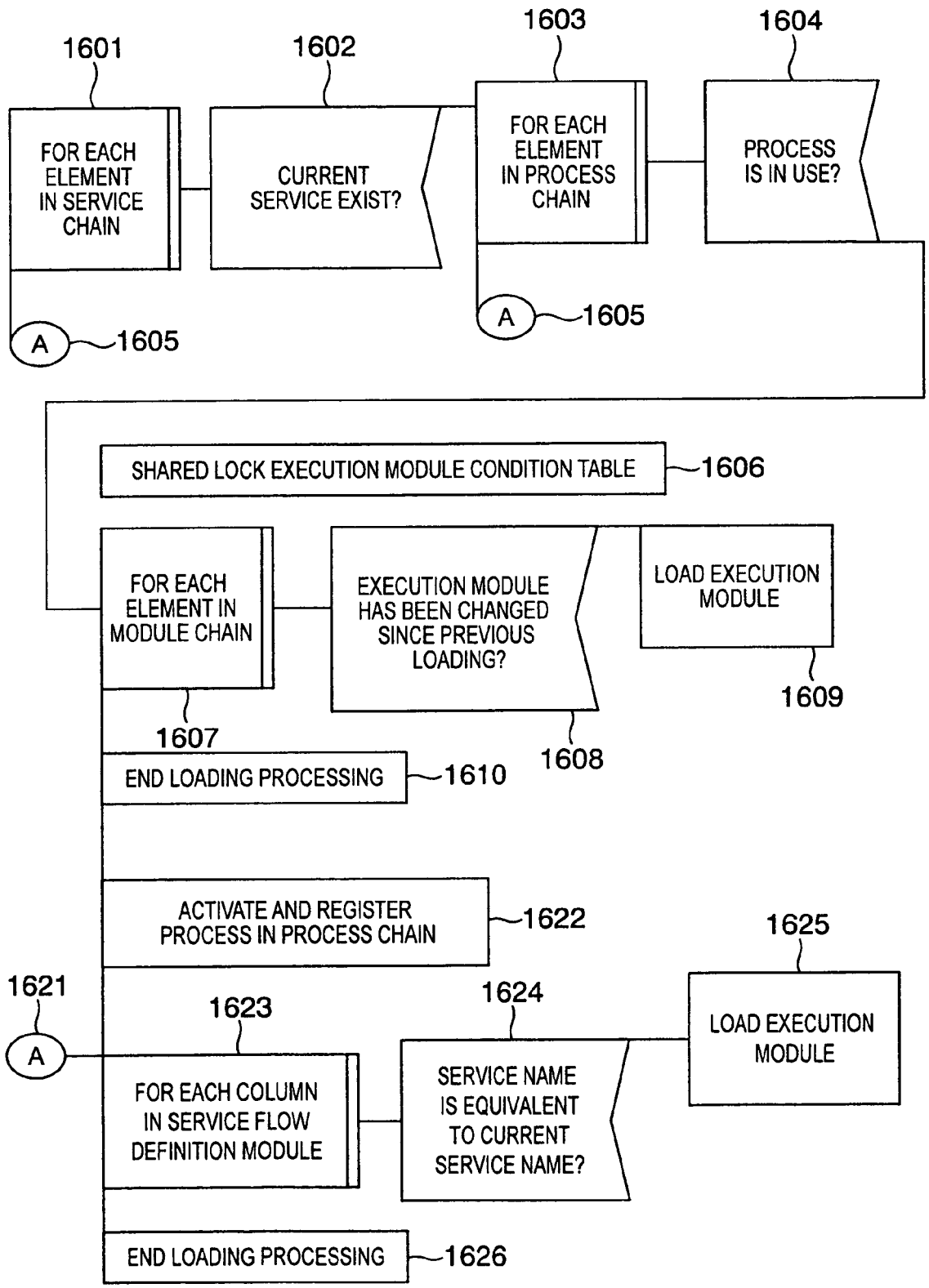
FIG. 12 is a PAD diagram showing operations of a dynamic loader.

Referring next to FIG. 12, a processing flow of the dynamic loader will be described.

First of all, the dynamic loader 105 traces the service chain (1521, 1522 in FIG. 11) in the process management information (1601) to check whether a service to be scheduled exists in the chain (1602).

If such a service exists, since at least one process has been already activated for processing the service, the dynamic loader 105 traces the process chain (1531, 1532 in FIG. 11) to search an unused process (1603, 1604).

If an unused process exists, the dynamic loader 105 shared-locks an execution module table 1700 in the execution module manager 106 to trace the module chain (1541 to 1543 in FIG. 11) constituting the process so as to check whether each module has been changed or updated since the previous loading (1607, 1608).

The details of the execution module manager 106 and the execution module management table 1700 will be described later: If a change is detected, the module concerned is loaded (1610).

On the other hand, if no service to be scheduled exists in the chain (1605), or if no unused process exists in the process chain (1606), the dynamic loader 105 activates a new process to load a necessary execution module or modules (1621).

In this processing, the dynamic loader 105 first activates the process to register the ID in the process chain (1622). Then, for each column of the service flow definition table in the service flow definition module 115 (1623), the dynamic loader 105 judges whether each module belongs to the service to which the dynamic loader's attention is now directed (1624). If each module belongs to the service, the dynamic loader 105 loads the module (1626). It should be noted that the process ID may be a "pid" to be attached in the UNIX operating system.

12. Execution Module Manager

The execution module manager 106 manages addition, update and deletion of execution modules in the execution module library 116. The execution module manager 106 has an execution module condition table as a data structure for holding or storing execution modules conditions.

Figure 13:
FIG. 13 is a diagram showing a configuration of an execution module condition table.

FIG. 13 shows an example of the execution module condition table.

Columns below heads 1701 to 1705 of the condition table 1700 correspond to respective execution modules stored in the execution module library 116. For each execution module, execution module name and update counter information (identifier) are stored.

The update counter has an integer indicative of the number of updates of the execution module concerned. The update counter stores "1" at the time of registration of a new module, and increments the number by one each time the module is updated.

The execution module condition table 1700 is accompanied with a lock field 1710. The field stores a lock state of the table, taking three values N (unlocked), S (shared-locking) and E (exclusive locking).

Figure 14:
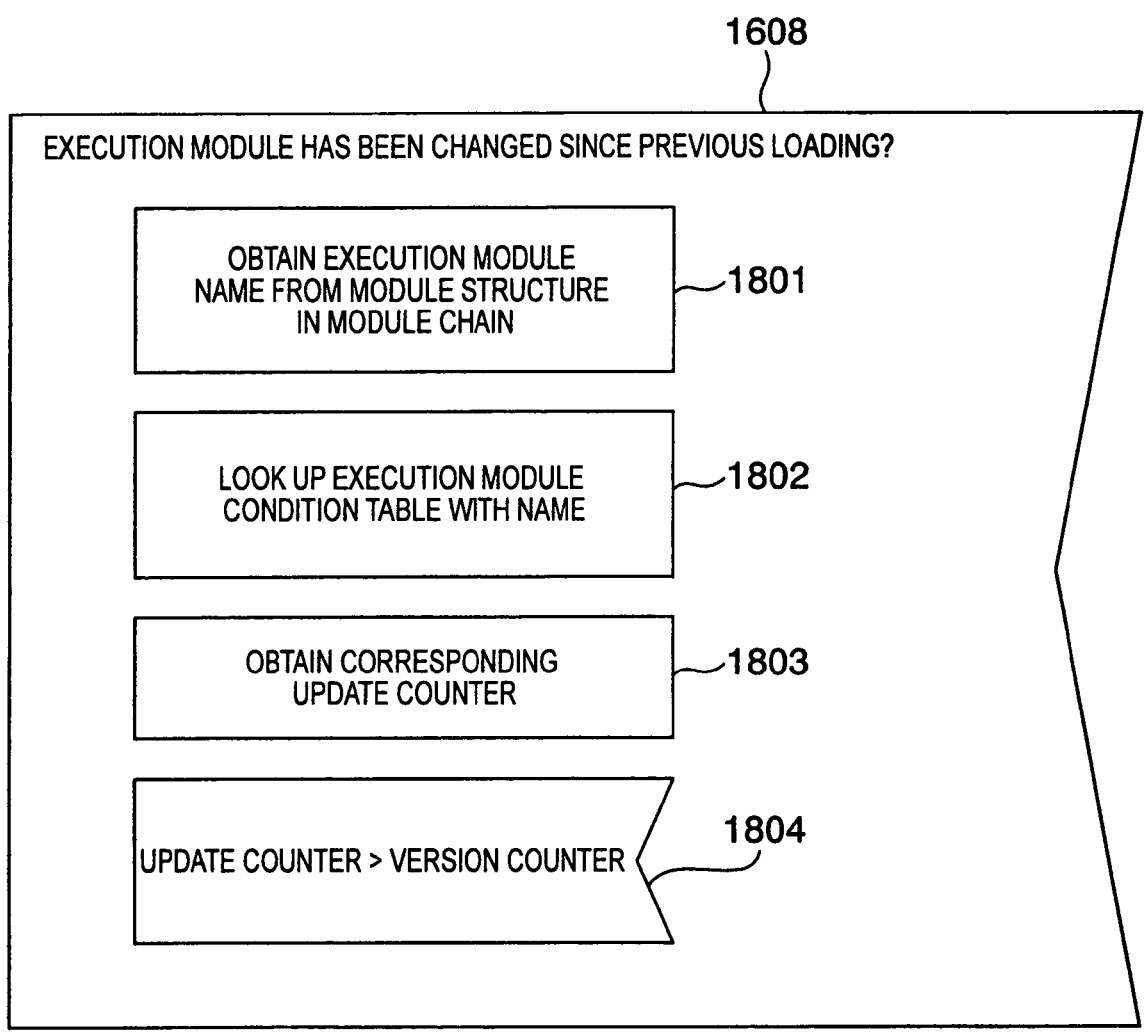
FIG. 14 is a PAD diagram showing detailed operations of the dynamic loader.

Referring next to FIG. 14, description will be made in detail about a step (1608 in FIG. 12) in which the dynamic loader 105 detects update conditions of the execution module using the condition table.

First of all, the dynamic loader 105 shared-locks the lock field of the execution module condition table 1700 (1606 in FIG. 12) to obtain, from a corresponding module structure (e.g., 1541), the name of the execution module to which the dynamic loader's attention is directed in the loop 1607 (1801).

Next, the dynamic loader 105 looks up the execution module condition table with the name (1802) to obtain a corresponding update counter (1803). Further, the dynamic loader 105 compares the counter value obtained with the value of a version counter (1510 in FIG. 11) in the module structure (e.g., 1541) (1804).

If the value of the update counter is equivalent to that of the version counter, the dynamic loader 105 determines that the execution module has not been changed since the previous loading to stop re-loading the execution module.

On the other hand, if the value of the update counter is larger than that of the version counter, the dynamic loader 105 determines that the execution module has been changed since the previous loading to re-load the execution module and substitute the value of the update counter into the version counter.

Figure 15:
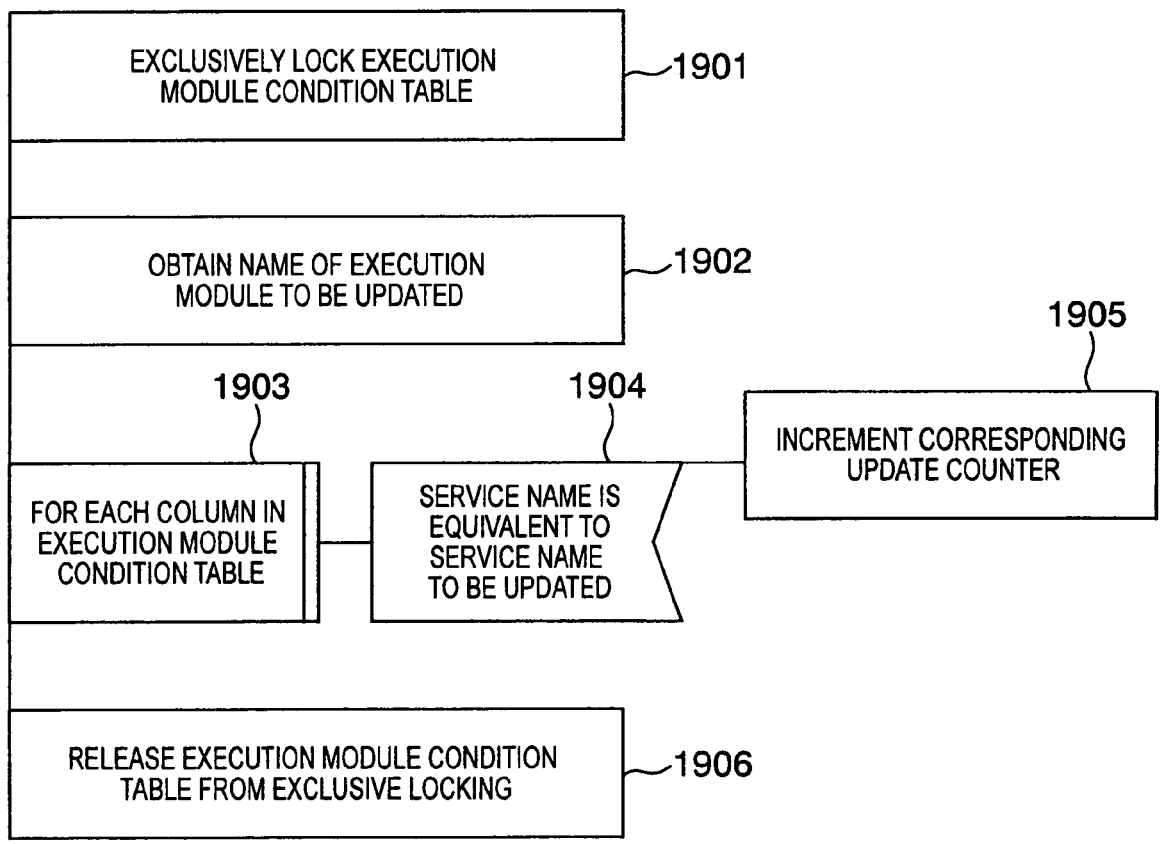
FIG. 15 is a PAD diagram showing operations of an execution module manager.

Referring next to FIG. 15, description will be made below about a processing flow of the execution module manager 106 upon updating modules in the execution module library.

First of all, the execution module manager 106 exclusively locks the lock field 1710 in the execution module condition table 1700 ("S") (1901).

Then, the execution module manager 106 obtains from the transaction monitor 120 the name of execution module library to be updated (1902).

The name concerned can be obtained, for example, from information input by an operator from an operation console (720 in FIG. 2) of the transaction monitor. Then, the execution module manager 106 searches the execution module condition table 1700 (1903) to find a column having the same name as that of the module to be updated (1904) so as to increment the update counter in the column (1905). Finally, the execution module manager 106 releases the execution module condition table 1700 from exclusive locking ("N") (1906).

13. Operation

In the above-mentioned structure, the request queues 110, 111 are provided one for each service of each service provider registered in the transaction monitor 120. In addition to the operation of the request queues 110, 111, the preprocessor 103 sends an input message to an appropriate request queues 110 or 111 on the basis of the contents of the message dictionary 114. The queuing condition detection module 112 monitors conditions of the request queues 110, 1111 to select requests to be scheduled by the scheduler 104. The Scheduler 104 controls the requests on the basis of the information indicative of service priorities to plural service providers (customers) stored in the SLA database 113 (contract information related to service levels). Therefore, one transaction monitor 120 (or message broker) can be commonly used for plural customers while allocating each request to the optimum resource according to the predetermined priority or resource conditions, which makes it possible to guarantee proper throughput on any service.

The transaction processing system can be used in a data center that performs contract outsourcing of plural service providers' systems and centralized control of computer resources. This makes possible real time processing of more on-line transactions with less computer resources with maintaining the throughput guaranteed under contract with the customers. Thus the reliability and performance of the data center that integrally processes business transactions for plural customers can be improved.

Further, the dynamic loader 105 that implements necessary processes for each of services provided by plural service providers collectively loads updated modules before transaction processing, the updated modules being judged by the execution module manager 106 that detects whether execution modules constituting each process are updated or not. Such a system makes it possible to change any service at any time when the transaction monitor 120 in operation without the need to provide means for disabling the routing of the execution modules or an auxiliary process group. Such a system can construct a transaction monitor 120 or message broker capable enhancing its flexibility and availability and making it easy to add and change business logic of customers with maintaining effective use of computer resources, which in turn makes the system operation easy.

Figure 16:
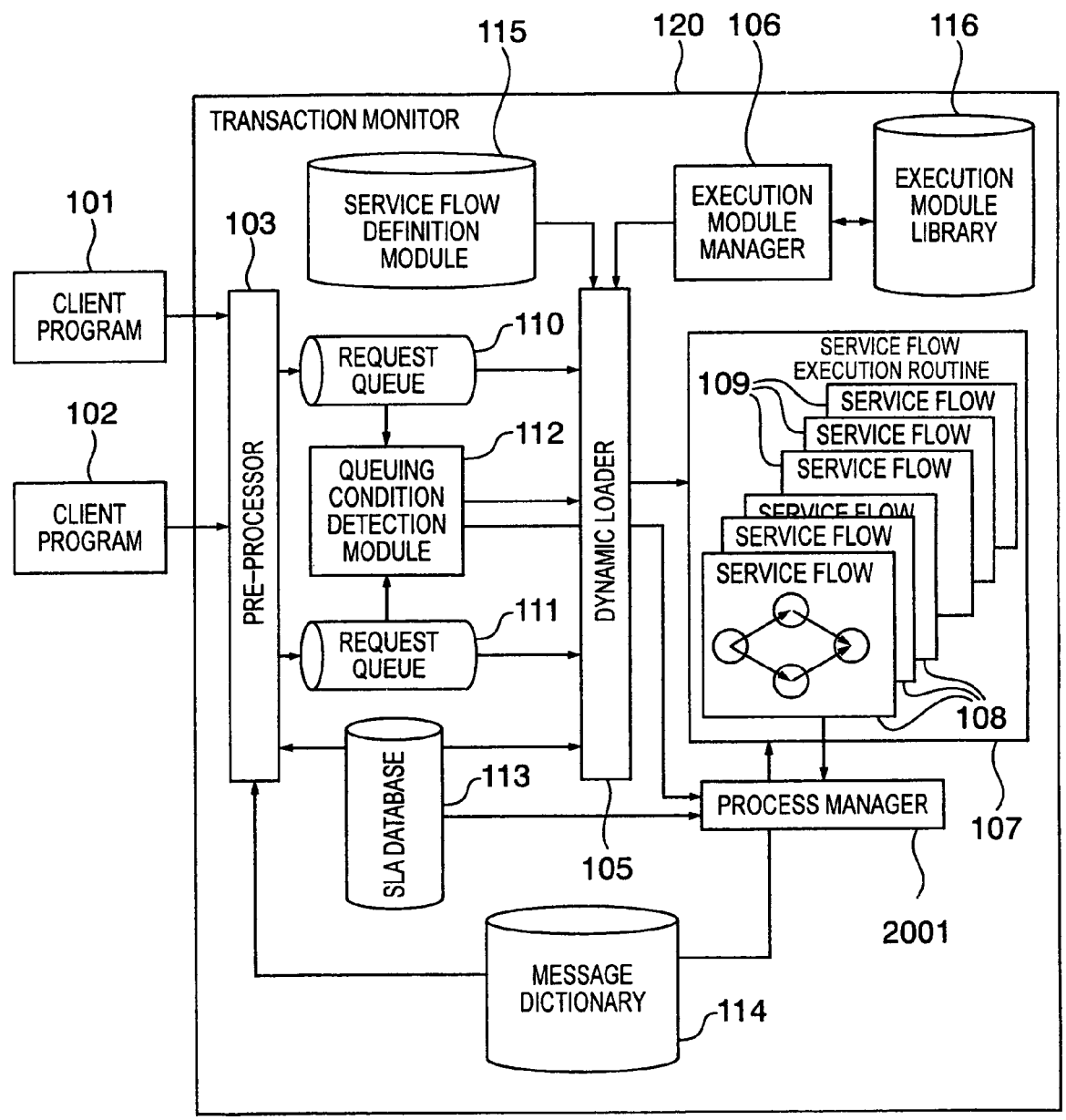
FIG. 16 is a block diagram showing a second embodiment according to the present invention.
Figure 17:
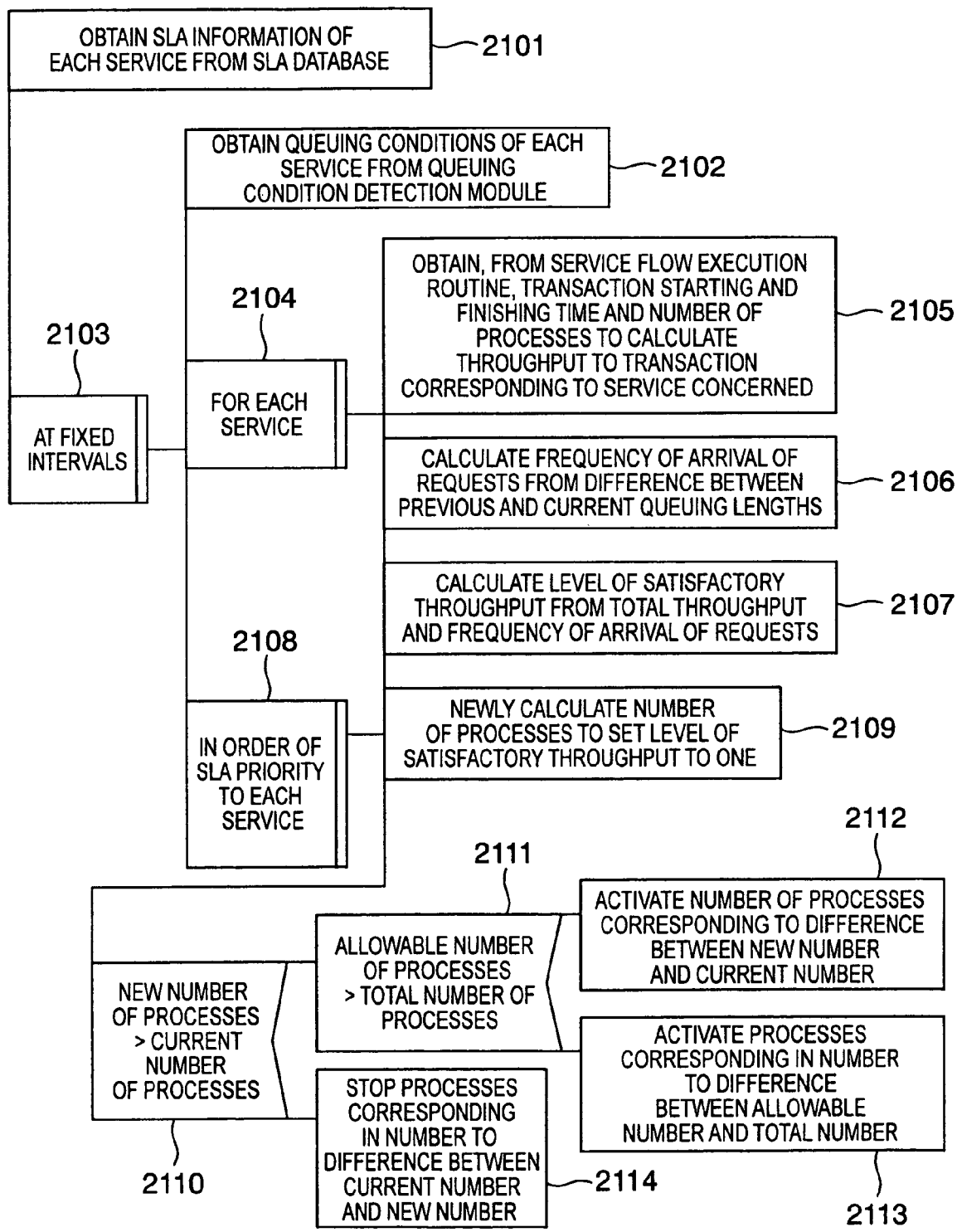
FIG. 17 is a PAD diagram showing operations of a process management module according to the second embodiment of the present invention.
Figure 18:
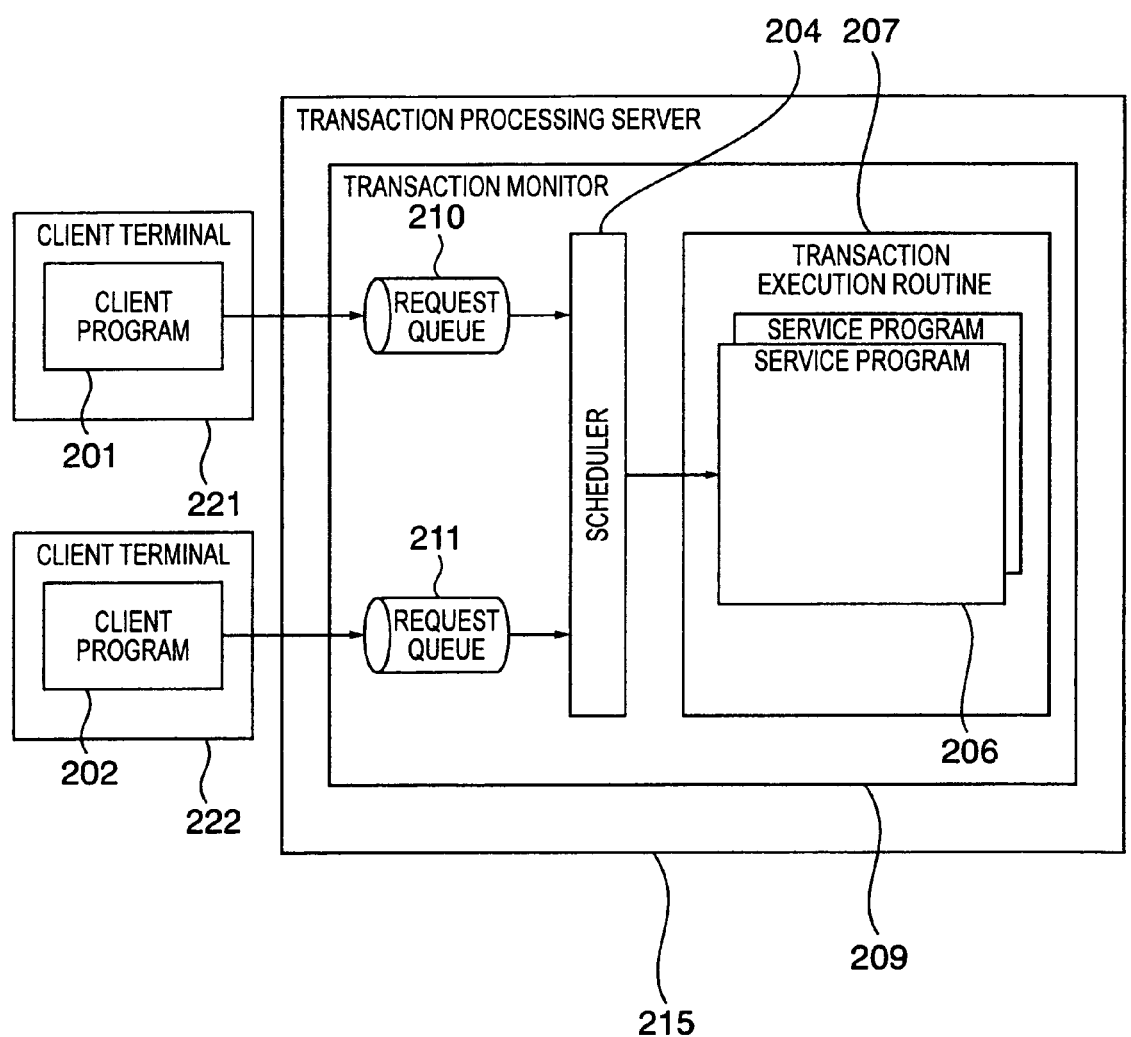
FIG. 18 is a block diagram showing a conventional transaction processing system.
Figure 19A:
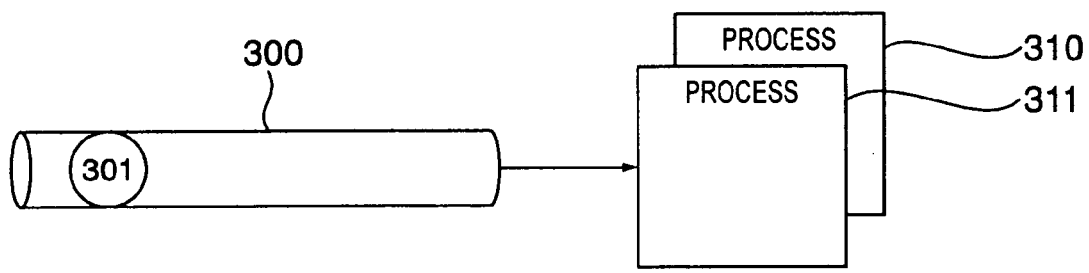
Figure 19B:
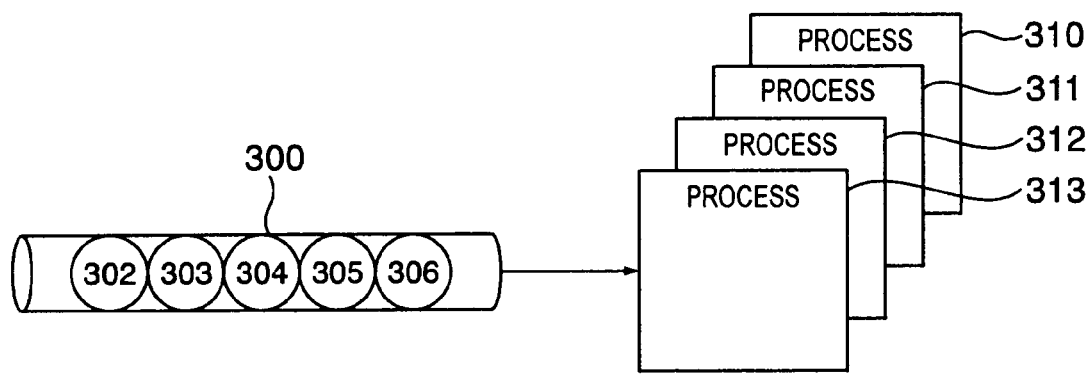
Figure 19C:
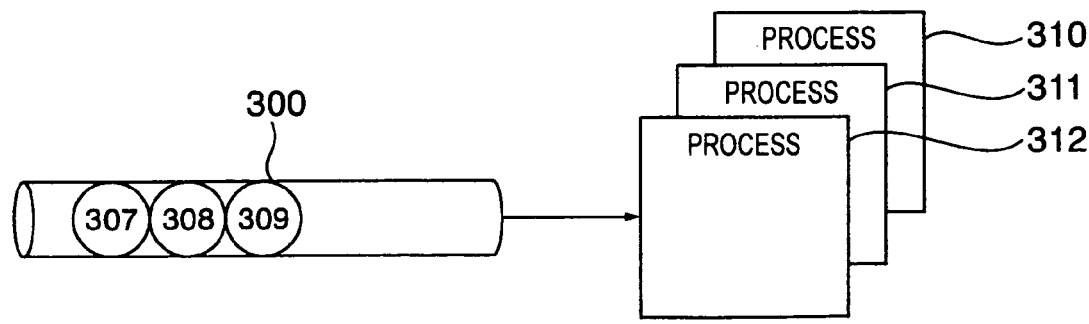
Figure 20:
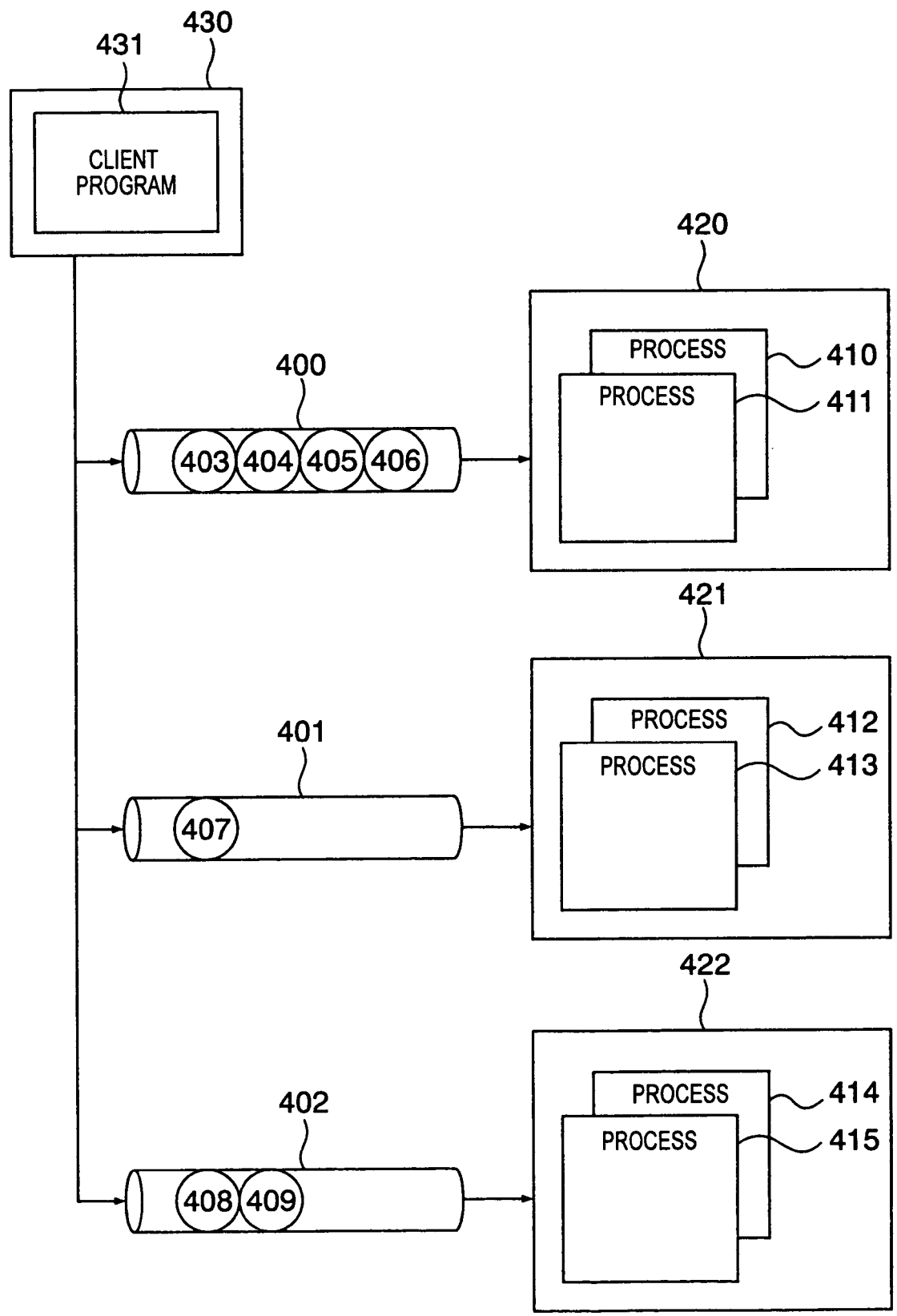
FIG. 20 is a diagram showing conventional priority control.
Figure 21:
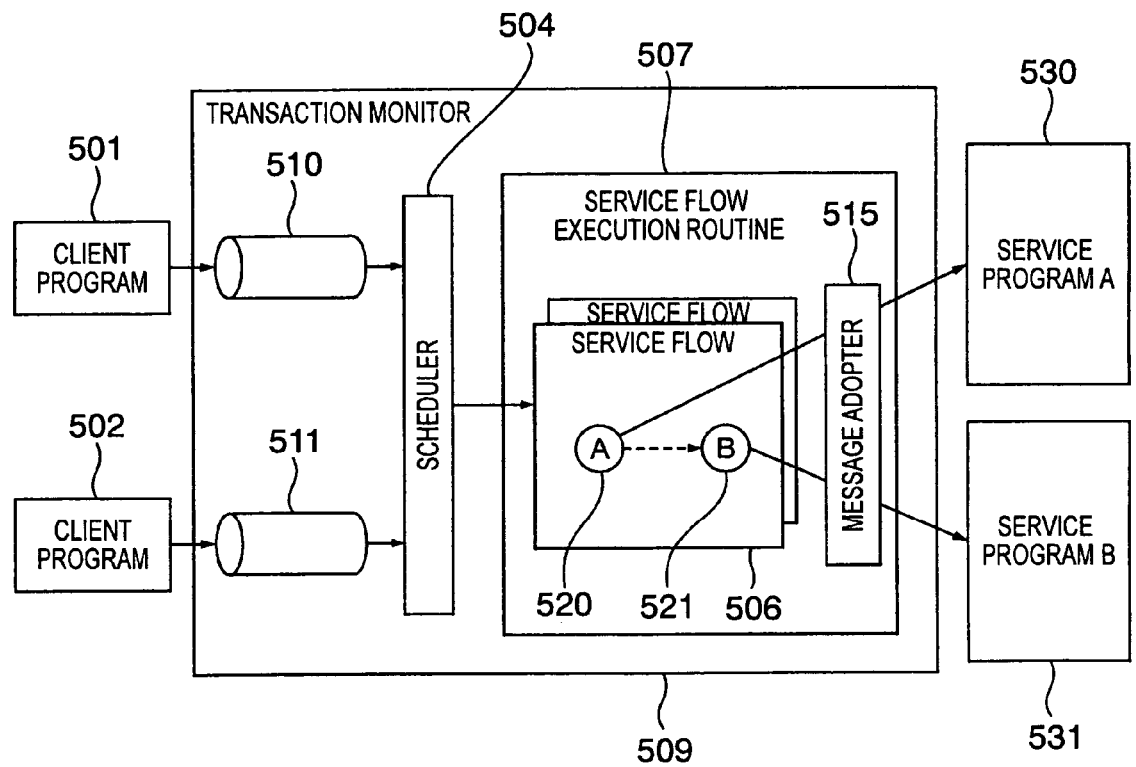
FIG. 21 is a block diagram showing a conventional message broker.

FIGS. 16 and 17 shows the second embodiment.

The first embodiment assumed a particular case where there was in the service flow execution routine 107 a number of idling processes enough for the scheduler to schedule all the requests.

In contrast, this embodiment assumes a normal case where the number of processes may not be secured due to limited computer resources and some processes needs to be traded off between services.

This embodiment is provided with a process manager 2001 instead of the scheduler 104. The other elements are the same as those in the first embodiment.

The process manager 2001 is operative to control the dynamic loader 105 by estimating the number of processes to be required for the processing concerned from service conditions of the request queues 110, 111 and the SLA contract.

After completion of a currently processed transaction, each process enters request acceptable state so that the next request can be extracted from a corresponding request queue 110 or 111 for the next transaction processing.

A processing flow of the process manager 2001 will be described based on FIG. 17.

Upon initiating the system, the process manager 2001 obtains the SLA conditions (in FIG. 3) related to each service from the SLA database 113 (2101). The process manager 2001 periodically monitors the queue and process conditions when the system is in operation (2103) to perform the following operations.

First of all, the process manager 2001 obtains the queuing information related to each service from the queuing condition detection module 112 (2102). The queuing information includes the number of waiting requests and the oldest time stamp. As discussed with respect to FIG. 9, the queuing information can be obtained by referring to the queuing information field 1118 of the request header extracted by the queuing condition detection module 112.

Next, for each service (2104), the process manager 2001 obtains, from the service flow execution routine, the transaction (2105) starting time and finishing time and the number of processes corresponding to the service to calculate throughput to the transaction.

In general, since plural processes correspond to one service (108, 109 in FIG. 16), the total throughput to the service concerned is determined by the sum of reciprocal numbers of time periods required for the transactions processed by the respective processes.

On the other hand, the process manager 2001 determines, from the queuing information obtained, a difference between the previous queuing length and the current queuing length (the number of waiting requests in the queue) to calculate the frequency of arrival of requests. The frequency of arrival of requests can be calculated by dividing the difference in the queuing length by the time interval (2106).

Alternatively, the process manager 2001 may obtain a difference between the start time and stop time of each transaction to determine throughput to the transaction by multiplying the reciprocal number of the difference by the number of processes to be allocated for the service (2107).

The total throughput thus obtained is compared with the frequency of arrival of requests, which makes it possible to estimate the level of satisfactory throughput to the service concerned.

In other words, if the total throughput is larger in number than the frequency of arrival of requests, the queuing length is considered to be reduced with time. If it is smaller, the queuing length is considered to increase with time. Here, the level of satisfactory throughput is determined by dividing the total throughput by the frequency of arrival of requests (2109).

After completion of determining the level of satisfactory throughput to each service, the process manager 2001 changes the number of processes for the service to control the processes so that the optimum throughput will be distributed to each service. Here, the process manager 2001 newly calculates the number of processes needed to set the level of satisfactory throughput to one or more in the order of priority decided according to the SLA contract (2108). If the number of processes newly calculated is larger than the number of process currently existing (2110), the process manager 2001 activates a number of processes corresponding to the difference between the newly calculated number and the existing number, and loads necessary execution modules through the dynamic loader 105 with keeping the loaded execution modules waiting (2112).

If the transaction monitor is limited in total number of processes and a necessary number of processes cannot be all activated (2111), a number of processes are activated as many as possible (2113). On the other hand, if there is room in the level of satisfactory throughput, affordable processes are stopped to release their system resources (2114).

Such a scheduling technique allows processes to be distributed to services having higher priorities in terms of SLA contract, which increase the probability of success in satisfying each service contract. At the same time, if there is room in the level of satisfactory throughput, affordable resources can also be allocated to such services that their priorities are low.

In other words, even if a sufficient number of processes cannot be secured due to limited computer resources, an appropriate throughput can be secured according to each SLA contract, thus controlling the computer resources and hence improving the system's reliability.

It should be noted here that when the frequency of arrival of requests largely varies, the operations shown in FIG. 17 may not be enough to prevent frequent start and stop of processes. To prevent excess variations in the number of processes, control can be carried out by taking into account histories of processes such as to prohibit the processes once activated from being stopped during a fixed time period.

Further, in the case that many of high-priority requests are input, the operations in FIG. 17 may keep low-priority requests waiting a long time. In this case, the minimum number of processes for each service has only to be determined beforehand so that the number of processes can be increased or decreased in such a range that the number of processes is never below the predetermined number.

Another feature of the second embodiment is transaction processing capable of providing one or more services and connecting one or more clients to each service. This feature is implemented by queuing means (110, 111) for storing processing requests from the clients for services while assigning priorities to the requests for each service, waiting condition obtaining means (queuing condition detection module 112) for obtaining waiting conditions of processing requests stored in the queuing means, and process allocating means (process manager 2001) for allocating processing processes of transactions to each service. In this configuration, the process allocating means decides the allocation of processes to each service by referring to the process request waiting conditions obtained and throughput to each transaction.

To be more specific, a program for allocating processes is carried out by comparing the frequency of arrival of processing requests in a unit time, calculated from the processing request waiting conditions, with the throughput to the transaction. If the frequency of arrival of processing requests is larger than the throughput to the transaction, the number of processes to be allocated is increased. On the other hand, if the frequency of arrival of processing requests is smaller than the throughput to the transaction, the number of processes to be allocated is reduced.

I claim:

1. A transaction processing system capable of providing one or a plurality of services and connecting one or more clients to each service provided by the system, comprising:

service level holding means for storing a corresponding relation between services and processing requests, said processing requests corresponding to the services being divided into a plurality of processing request groups including at least first and second processing request groups;

setting means, coupled to said service level holding means, for setting a first processing condition and an additional first processing condition of the first processing request group and a second processing condition of the second processing request group;

receiving and determining means for receiving an input processing request and determining which of said first and second processing request groups the input processing request belongs to;

first detecting means, responsive to the receiving and determining means, for detecting whether or not the input processing request belonging to the first processing request group satisfies the first processing condition of the first processing request group;

second detecting means for detecting whether first and second processing requests belonging to the first and second processing request groups, respectively are in a waiting condition awaiting processing;

processing request scheduling means responsive to the first and second detecting means for scheduling the input processing requests, wherein when the first and second processing requests are in a waiting condition awaiting processing, said request scheduling means schedules the first processing request which satisfies the first processing condition of the first group, but does not satisfy the additional first processing condition of the first group, and schedules the second processing request if the first processing request in the waiting condition satisfies both the first processing condition of the first group and the additional first processing condition of the first group; and execution processing means for performing processing of the processing request scheduled by said request scheduling means.

2. The system according to claim 1, wherein the service levels have at least an upper limit class and a best effort class, and
wherein the upper limit class has an allowable waiting time for the service, and the best effort class has no allowable waiting time.

3. The system according to claim 1, wherein the client has a plurality of the service and the priority conditions are defined to the services independently.

4. A program implemented on a computer-readable medium having a computer execute transaction processing capable of providing one or more services and connecting one or more clients to each of the services provided, comprising:
service level holding means for storing a corresponding relation between services and processing requests, said processing requests corresponding to the services being divided into a plurality of processing request groups including at least first and second processing request groups;
setting means, coupled to said service level holding means, for setting a first processing condition and an additional first processing condition of the first processing request group and a second processing condition of the second processing request group;
receiving and determining means for receiving an input processing request and determining which of said first and second processing request groups the input processing request belongs to;
first detecting means, responsive to the receiving and determining means, for detecting whether or not the input processing request belonging to the first processing request group satisfies the first processing condition of the first processing request group;
second detecting means for detecting whether first and second processing requests belonging to the first and second processing request groups, respectively are in a waiting condition awaiting processing;
processing request scheduling means responsive to the first and second detecting means for scheduling the input processing requests,
wherein when the first and second processing requests are in a waiting condition awaiting processing, said request scheduling means schedules the first processing request which satisfies the first processing condition of the first processing request group, but does not satisfy the additional first processing condition of the first processing request group, and schedules the second processing request if the first processing request in the waiting condition satisfies both the first processing condition of the first processing request group and the additional first processing condition of the first group; and
execution processing means for performing processing of the processing request scheduled by said request scheduling means.

5. A transaction processing method providing one or a plurality of services and connecting one or more clients to each service provided, said transaction processing method being implemented in a computer comprising a processor and comprising the steps of:
storing, by said processor, a corresponding relation between services and processing requests, said processing requests corresponding to the services being divided into a plurality of processing request groups including at least first and second processing request groups;
setting, by said processor, a first processing condition and an additional first processing condition of the first processing request group and a second processing condition of the second processing request group;
receiving an input processing request and determining which of said first and second processing request groups the input processing request belongs to;
first detecting whether or not the input processing request having been received and belonging to the first processing request group satisfies the processing condition of the first processing request group according to the receiving and determining step;
second detecting whether first and second processing requests belonging to the first and second processing request groups, respectively are in a waiting condition awaiting processing;
scheduling, in response to the first and second detecting steps, the input processing requests,
wherein when the first and second processing requests are in a waiting condition awaiting processing, said scheduling step schedules the first processing request which satisfies the first processing condition of the first processing request group, but does not satisfy the additional first processing condition of the first processing request group, and schedules the second processing request if the first processing request in the waiting condition satisfies both the first processing condition of the first processing request group and the additional first processing condition of the first group; and
performing processing of the processing request scheduled by said scheduling steps.

6. A transaction processing system capable of providing one or a plurality of services and connecting one or more clients to each service provided by the system, comprising:
service level holding means for storing a corresponding relation between services and requests, said requests corresponding to the services being divided into a plurality of groups including at least first and second groups;
setting means, coupled to said service level holding means, for setting a first processing condition and an additional first processing condition of the first processing request group, and a second processing condition of the second processing request group;
receiving and determining means for receiving an input processing request, storing the input processing request into one of processing waiting lists created for each services and determined which of said first and second groups the waiting list belongs to;
processing request scheduling means for selecting an oldest request of the waiting lists belonging to the first group and an oldest request of the waiting lists belonging to the second group and scheduling one of the oldest requests,
wherein said request scheduling means schedules the oldest request of the waiting list belonging to the first group if the oldest request of the waiting list belonging to the first group satisfies the first processing condition, but does not satisfy the additional first processing condition, and schedules the old request of the waiting list belonging to the second group if the oldest request of the waiting first belonging to the first group satisfies both the first processing condition and the additional first processing condition; and
executing processing means for performing processing of the request scheduled by said request scheduling means.

* * * * *